United States Patent
Sudoh

(10) Patent No.: US 8,405,917 B2
(45) Date of Patent: Mar. 26, 2013

(54) ZOOM LENS, IMAGING DEVICE AND INFORMATION DEVICE

(75) Inventor: Yoshifumi Sudoh, Machida (JP)

(73) Assignee: Ricoh Company, Ltd., Tokyo (JP)

( * ) Notice: Subject to any disclaimer, the term of this patent is extended or adjusted under 35 U.S.C. 154(b) by 95 days.

(21) Appl. No.: 13/046,087

(22) Filed: Mar. 11, 2011

(65) Prior Publication Data
US 2011/0222169 A1  Sep. 15, 2011

(30) Foreign Application Priority Data

Mar. 12, 2010  (JP) .................................. 2010-055377

(51) Int. Cl.
*G02B 15/14* (2006.01)
(52) U.S. Cl. ...................................................... 359/687
(58) Field of Classification Search .................. 359/676, 359/686, 687
See application file for complete search history.

(56) References Cited

U.S. PATENT DOCUMENTS

| | | | |
|---|---|---|---|
| 5,572,277 | A  | 11/1996 | Uzawa et al. |
| 7,372,636 | B2 | 5/2008  | Sudoh |
| 7,535,653 | B2 | 5/2009  | Sudoh |
| 7,623,298 | B2 | 11/2009 | Sudoh |
| 7,636,201 | B2 | 12/2009 | Sudoh et al. |
| 7,719,773 | B2 | 5/2010  | Atsuumi et al. |
| 7,864,443 | B2 | 1/2011  | Sudoh et al. |
| 7,869,143 | B2 | 1/2011  | Sudoh |
| 2008/0112061 | A1 | 5/2008 | Miyajima |
| 2008/0204892 | A1 | 8/2008 | Satori et al. |
| 2008/0278779 | A1 | 11/2008 | Nishina et al. |
| 2009/0174952 | A1 | 7/2009 | Satori |

(Continued)

FOREIGN PATENT DOCUMENTS

| | | |
|---|---|---|
| JP | 3328001   | 7/2002 |
| JP | 2006-23531 | 1/2006 |

(Continued)

OTHER PUBLICATIONS

Extended European Search Report issued Aug. 3, 2011, in European Patent Application No. 11157529.6.
U.S. Appl. No. 13/050,552, filed Mar. 17, 2011, Sudoh.

*Primary Examiner* — Darryl J Collins
(74) *Attorney, Agent, or Firm* — Oblon, Spivak, McClelland, Maier & Neustadt, L.L.P.

(57) ABSTRACT

A zoom lens includes, in order from an object side, a first lens group having a positive refractive power, a second lens group having a negative refractive power, the second lens group including, in order from the object side, a first negative lens and a cemented lens including a second negative lens having a convex shape on the object side and a positive lens, a third lens group having a positive refractive power, a fourth lens group having a positive refractive power, and an aperture stop arranged between the second lens group and the third lens group, wherein when changing a magnification from a short focal end to a telephoto end, an interval between the first lens group and the second lens group is increased, an interval between the second lens group and the third lens group is decreased, an interval between the third lens group and the fourth lens group is increased, and the first lens group and the third lens group are moved to be located closer to the object side at the long focal end than the short focal end.

17 Claims, 14 Drawing Sheets

U.S. PATENT DOCUMENTS

| | | |
|---|---|---|
| 2009/0273848 A1 | 11/2009 | Chang |
| 2010/0027136 A1 | 2/2010 | Ohashi et al. |
| 2010/0195217 A1* | 8/2010 | Ohtake et al. ............... 359/687 |
| 2010/0296180 A1 | 11/2010 | Sudoh et al. |
| 2011/0043927 A1 | 2/2011 | Sudoh |
| 2011/0051260 A1 | 3/2011 | Nakayama et al. |

FOREIGN PATENT DOCUMENTS

| | | |
|---|---|---|
| JP | 2008-145501 | 6/2008 |
| JP | 2009-198798 | 9/2009 |

* cited by examiner (a) SHORT FOCAL END (Wide)

(b) SHORT-INTERMEDIATE (W-M)

(c) INTERMEDIATE FOCAL LENGTH (Mean)

(d) INTERMEDIATE-LONG (M-T)

(e) LONG FOCAL END (Tele)

(a) SHORT FOCAL END (Wide)

(b) SHORT-INTERMEDIATE (W-M)

(c) INTERMEDIATE FOCAL LENGTH (Mean)

(d) INTERMEDIATE-LONG (M-T)

(e) LONG FOCAL END (Tele)

(a) SHORT FOCAL END (Wide)

(b) SHORT-INTERMEDIATE (W-M)

(c) INTERMEDIATE FOCAL LENGTH (Mean)

(d) INTERMEDIATE-LONG (M-T)

(e) LONG FOCAL END (Tele)

(a) SHORT FOCAL END (Wide)

(b) SHORT-INTERMEDIATE (W-M)

(c) INTERMEDIATE FOCAL LENGTH (Mean)

(d) INTERMEDIATE-LONG (M-T)

(e) LONG FOCAL END (Tele)

ZOOM LENS, IMAGING DEVICE AND INFORMATION DEVICE

PRIORITY CLAIM

The present application is based on and claims priority from Japanese Patent Application No. 2010-055377, filed on Mar. 12, 2010, the disclosure of which is hereby incorporated by reference in its entirety.

BACKGROUND OF THE INVENTION

1. Field of the Invention

The present invention relates to a zoom lens having a magnification function which changes a field angle by changing a focal length, in particular, to a zoom lens suitable for a digital camera, a video camera and the like, which obtain digital image data of a subject by using an imaging element, to an imaging device using such a zoom lens as an imaging optical system, and to an information device such as a personal digital assistant having such an imaging function.

2. Description of the Related Art

There has been a significant growth in the digital camera market, and users have a wide variety of demands for digital cameras. Particularly, users always desire high quality picture technology and downsizing technology, which are the main demands of digital camera users. For this reason, the high quality picture technology and the downsizing technology are also required for a zoom lens which is used as a shooting lens.

Regarding the downsizing technology, at first, it is necessary to reduce the entire length of lenses in use (distance from a most object side lens surface to an imaging plane), and it is also important to reduce the entire length in a collapsed state by reducing a thickness of each lens group. Regarding the high performance technology, resolution corresponding to an imaging element having at least 10 million-15 million pixels is required for the entire zooming range.

Moreover, a wider field angle of a shooting lens is required by many users, and a half-field angle of a zoom lens at a short focal end is preferably 38 degrees or more. The half-field angle of 38 degrees corresponds to a focal length of 28 mm in a case of a silver-salt camera using a silver salt film (i.e., Leica film) having a width of 35 mm. Furthermore, a high magnification ratio is also required. The zoom lens having a focal length corresponding to about 28 to 200 mm in a 35 mm silver salt camera conversion (about 7.1 times) enables all general shooting.

As a zoom lens for a digital camera, various types of zoom lenses are used. As a zoom lens suitable for a high magnification, there is a zoom lens including, in order from an object side, a first lens group having a positive refractive power, a second lens group having a negative refractive power, a third lens group having a positive refractive power and a fourth lens group having a positive refractive power, in which when changing a magnification from a short focal end to a long focal end, an interval between the first lens group and the second lens group is increased, an interval between the second lens group and the third lens group is decreased, and an interval between the third lens group and the fourth lens group is changed.

The zoom lens of this type includes, for example, a zoom lens in which a first lens group is fastened when changing a magnification and a zoom lens in which a first lens group reciprocates in arc having a convex shape on an image side when changing a magnification. In this type, if a large displacement of the second lens group which largely shares a magnification function is ensured, an aperture stop disposed near the third lens group separates from the first lens group even when the zoom lens is at the short focal end. Accordingly, the size of the first lens group is increased for a wide angle and high magnification zoom lens. Therefore, in order to achieve a wide angle, high magnification and small zoom lens, it is preferable for the first lens group to move so as to be located closer to the object side at the long focal end than the short focal end. By reducing the entire length of lenses at the short focal end compared to the long focal end, the size of the first lens group is prevented from increasing and a significant wide angle can be achieved.

Since the second lens group is constituted as a variator having a main magnification function, the constitution of the second lens group is very important. As a known second lens group, a second lens group including, in order from the object side, three lenses of a negative lens having a large curvature surface on the image side, a negative lens having a concave surface on the object side and a positive lens having a convex surface on the object side, which are arranged in order from the object side, is described in, for example, Japanese Patent Application Nos. 2008-145501, 2006-23531 and Japanese Patent No. 3328001.

Moreover, as a known second lens group, a second lens group including three lenses of a negative lens having a large curvature surface on the image side, a negative lens having a convex surface on the object side and a positive lens having a convex surface on the object side, which are arranged in order from the object side, is described in Japanese Patent Application No. 2009-198798.

However, the zoom lens described in each of Japanese Patent Application Nos. 2008-145501 and 2006-23531 is not a high magnification zoom lens of 8 times or more. Moreover, the second negative lens from the object side and the positive lens in the second lens group are not joined, so that the eccentric amount of these lenses is increased, resulting in a decrease in the resolution. On the other hand, the zoom lens described in Japanese Patent No. 3328001 has a high magnification. However, the entire length of lenses at the long focal end is increased, so that a small zoom lens is not achieved.

Furthermore, the zoom lens described in Japanese Patent Application No. 2009-198798 is not a high magnification zoom lens of 8 times or more. In this zoom lens, the second negative lens from the object side and the third lens in the second lens group are not joined, so that the eccentric amount of the these lenses is increased, resulting in a decrease in the resolution.

SUMMARY OF THE INVENTION

The present invent has been made in light of the above circumstances, and an object of the present invention is to provide a zoom lens having a significant wide angle, that is, a half-field angle of 38 degrees or more at a short focal end and a magnification ratio of 8 times or more. The zoom lens also achieves a small size with about 10 lenses in the configuration and a resolution corresponding to an imaging element having 10 to 15 million pixels for the entire magnification range. The present invention also aims to provide an imaging device and an information device using such a zoom lens.

In order to achieve the above object, an embodiment of the present invention provides a zoom lens, including: in order from an object side, a first lens group having a positive refractive power; a second lens group having a negative refractive power, the second lens group including, in order from the object side, a first negative lens and a cemented lens including a second negative lens having a convex shape on the object side and a positive lens; a third lens group having a positive refractive power; a fourth lens group having a positive refractive power; and an aperture stop arranged between the second lens group and the third lens group. When changing a magnification from a short focal end to a telephoto end, an interval between the first lens group and the second lens group is increased, an interval between the second lens group and the third lens group is decreased, an interval between the third lens group and the fourth lens group is increased, and the first lens group and the third lens group are moved to be located closer to the object side at the long focal end than the short focal end.

Preferably, the following conditional expression is satisfied where a focal length of the first negative lens of the second lens group is f21 and a focal length of the second negative lens f the second lens group is f22;

0.1<f21/f22<0.8

Preferably, the following conditional expression is satisfied where a focal length of the first negative lens of the second lens group is f21 and a focal length of the second lens group is f2;

0.5<f21/f2<1.5

Preferably, the following conditional expression is satisfied where a thickness of the second lens group on an optical axis is D2 and a focal length of an entire lens system of at the short focal end is fw;

0.7<D2/fw<1.3

Preferably, the following conditional expression is satisfied where an interval between the second lens group and the aperture stop at the short focal end is D2Sw and an interval between the aperture stop and the third lens group at the short focal end is DS3w;

0.3<DS3w/D2Sw<2.0

Preferably, an image side surface of the positive lens of the second lens group has a convex shape on the object side and an aspheric face.

Preferably, the following conditional expression is satisfied where a variation of the interval between the first lens group and the second lens group when changing a magnification from the short focal end to the long focal end is X1-2 and a focal length of the second lens group is f2;

2.0<|X1-2/f2|<4.0

Preferably, the following conditional expression is satisfied where an effective light beam diameter of an object side surface of the first negative lens of the second lens group is φ1 and an effective light beam diameter of the object side surface of the second negative lens of the second lens group is φ2;

0.50<φ2/φ1<0.80

An embodiment of the present invention also provides an imaging device comprising the zoom lens according to an embodiment of the present invention as an imaging optical system.

An embodiment of the present invention also provides an information device having an imaging function comprising the zoom lens according to an embodiment of the present invention as an imaging optical system.

BRIEF DESCRIPTION OF THE DRAWINGS

The accompanying drawings are included to provide further understanding of the invention, and are incorporated in and constitute a part of this specification. The drawings illustrate embodiments of the invention and, together with the specification, serve to explain the principle of the invention.

DETAILED DESCRIPTION OF THE PREFERRED EMBODIMENTS

Figure 1:
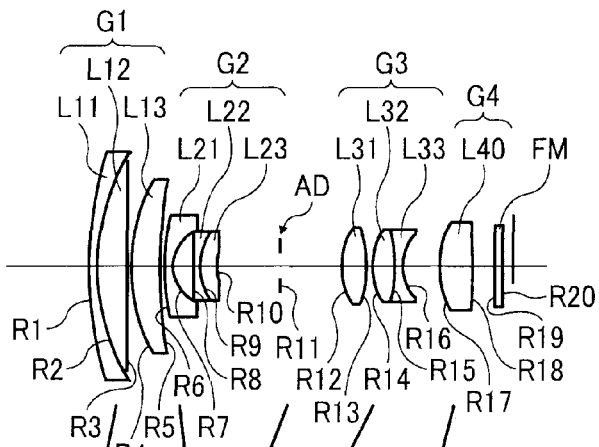
FIG. 1 is a schematic view illustrating a configuration of an optical system of a zoom lens and a zooming trajectory according to Embodiment 1 of a first embodiment of the present invention.
Figure 1:
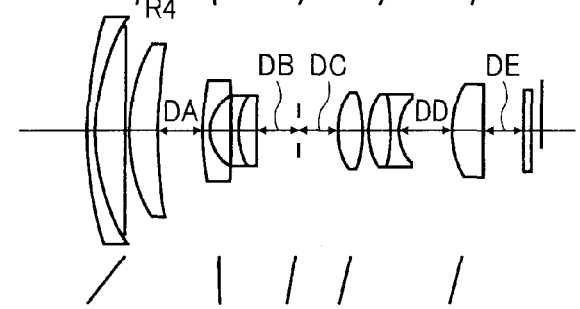
Figure 1:
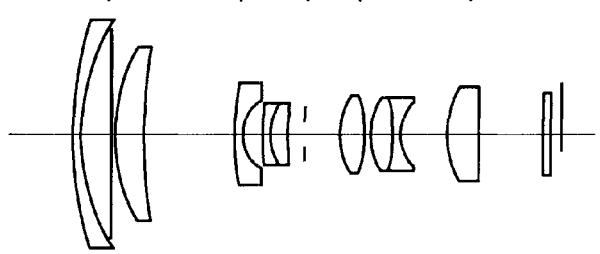
Figure 1:
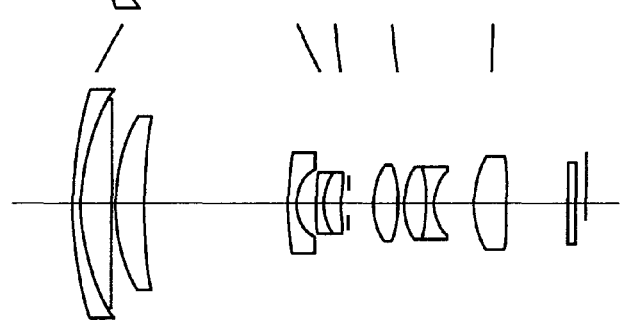
Figure 1:
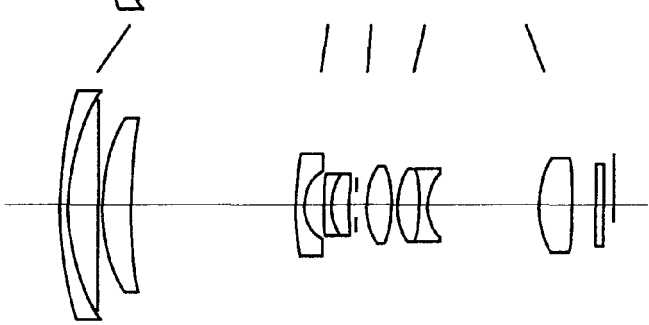

Hereinafter, details of a zoom lens, an imaging device and an information device according to embodiments of the present invention will be described with reference to the drawings.

A zoom lens according to a first embodiment of the present invention includes, in order from an object side, a first lens group having a positive refractive power, a second lens group having a negative refractive power, a third lens group having a positive refractive power and a fourth lens group having a positive refractive power, in which when changing a magnification from a short focal end (wide angle end) to a long focal end (telephoto end), the interval between the first lens group and the second lens group is increased, the interval between the second lens group and the third lens group is decreased, the interval between the third lens group and the fourth lens group is increased, and the first lens group and the third lens group are moved to be located closer to the object side at the long focal end than the short focal end.

At first, the first feature of the zoom lens according to the embodiment of the present invention is to dispose an aperture stop between the second lens group and the third lens group, and to have the second lens group including, in order from the object side, a first negative lens, a second negative lens having a convex shape on the object side and a positive lens, the second negative lens and the positive lens being closely attached to each other to form a cemented lens.

Next, the second feature of the zoom lens according to the embodiment of the present invention is to satisfy the following conditional expression.

$$0.1 < f21/f22 < 0.8$$

Where, f21 is a focal length of the first negative lens (L21) of the second lens group and f22 is a focal length of the second negative lens (L22) of the second lens group.

The third feature of the zoom lens according to the embodiment of the present invention is to satisfy the following conditional expression.

$$0.5 < f21/f2 < 1.5$$

Where, f21 is the focal length of the first negative lens (L21) of the second lens group and f2 is a focal length of the entire second lens group.

The fourth feature of the zoom lens according to the embodiment of the present invention is to satisfy the following conditional expression.

$$0.7 < D2/fw < 1.3$$

Where, D2 is a thickness of the second lens group on the optical axis and fw is a focal length at the short focal end.

The fifth feature of the zoom lens according to the embodiment of the present invention is to satisfy the following conditional expression.

$$0.3 < DS3w/D2Sw < 2.0$$

Where, D2Sw is the interval between the second lens group and the aperture stop at the short focal end and DS3w is the interval between the aperture stop and the third lens group at the short focal end.

The sixth feature of the zoom lens according to the embodiment of the present invention is that the image side surface of the positive lens of the second lens group has a convex shape on the object side (i.e., the image side surface of the positive lens of the second lens group is a concave surface) and an aspheric surface.

The seventh feature of the zoom lens according to the embodiment of the present invention is to satisfy the following conditional expression.

$$2.0 < |X1-2/f2| < 4.0$$

Where, X1-2 is a variation of the interval between the first lens group and the second lens group when changing a magnification from the short focal end to the long focal end and f2 is a focal length of the entire second lens group.

The eighth feature of the zoom lens according to the embodiment of the present invention is to satisfy the following conditional expression.

$$0.50 < \phi2/\phi1 < 0.80$$

Where, $\phi1$ is an effective light beam diameter of the object side surface of the first negative lens (L21) of the second lens group and $\phi2$ is an effective light beam diameter of the object side surface of the second negative lens (L22) of the second lens group.

In the zoom lens including the four lens groups, positive, negative, positive and positive, the second lens group generally has a main magnification function as a variator. When changing a magnification from the short focal end to the long focal end, the first lens group is largely moved to the object side, so that the height of the light beam passing through the first lens group at the short focal end is lowered. Accordingly, the size of the first lens group is prevented from increasing in a wider angle zoom lens, and a large interval between the first lens group and the second lens group is ensured at the long focal end to achieve a long focal length.

When changing a magnification from the short focal end to the long focal end, the interval between the first lens group and the second lens group is increased, and the interval between the second lens group and the third lens group is decreased, so that the magnifications (absolute values) of both of the second lens group and the third lens group are increased and therefore the magnification function is shared by the second lens group and the third lens group.

In the conventional optical design, the most object side negative lens in the second lens group had only a certain amount of power. For this reason, in order to reduce the distortion at the short focal end, the object side surface of the second negative lens (L22) from the object side in the second lens group had a concave shape to increase the incident angle to the surface of the off-axis light beam, so that the degree of freedom of the correction of the off-axis aberration at the short focal end was obtained. However, a design which accepts distortion has been available by correcting distortion of an image with an image process.

Consequently, in the zoom lens according to the embodiment of the present invention, the second lens group includes, in order from the object side, the negative lens (L21) and the cemented lens in which the negative lens (L22) having the convex shape on the object side and the positive lens (L23) are closely attached to each other.

By accepting the distortion at the short focal end, the most object side negative lens (L21) in the second lens group has a large power, so that the off-axis aberration in the second lens group can be sufficiently corrected. Therefore, by using the convex surface on the object side surface of the second negative lens (L22) from the object side in the second lens group, the aberration generated in that surface can be reduced, and the effect of the eccentricity and the like can be reduced. In addition, the effect of the eccentricity of the negative lens (L22) relative to the positive lens (L23) having a large power at the long focal end can be sufficiently curbed by joining the negative lens (L22) and the positive lens (L23).

In order to control the effect of the eccentricity and the like at high levels, it is desirable to satisfy the following conditional expression (1).

$$0.1 < f21/f22 < 0.8$$

Where, f21 is the focal length of the first negative lens (L21) of the second lens group and f22 is the focal length of the second negative lens (L22) of the second lens group.

In the above conditional expression (1), if the value misses the range of the upper limit value and the lower limit value, the first negative lens (L21) of the second lens group or the second negative lens (L22) of the second lens group has a strong power, and the lens having the strong power generates large aberration, so that it becomes difficult to correct the aberration of the entire zooming range. It also becomes difficult to control the effect of the eccentricity of the lens having the strong power.

It is more preferable to satisfy the following conditional expression (1').

$$0.2 < f21/f22 < 0.7$$

In order to control the effect of the eccentricity and the like at high levels, it is preferable to satisfy the following conditional expression (2).

$$0.5 < f21/f2 < 1.5$$

Where, f21 is the focal length of the first negative lens (L21) of the second lens group and f2 is the focal length of the entire second lens group.

In the above conditional expression (2), if the value exceeds the upper limit value, the height of the off-axis light beam passing through the second lens group at the short focal end is increased, so that it becomes difficult to correct the off-axis aberration at the short focal end. If the value is lower than the lower limit value, the aberration generating on the image side surface of the negative lens (L21) becomes too large, so that it becomes difficult to correct the aberration of the entire zooming range. The effect of the eccentricity of the image side surface of the negative lens (L21) on the image quality is also increased.

It is more preferable to satisfy the following conditional expression (2').

$$0.7 < f21/f2 < 1.2$$

In order to further improve the performance of the zoom lens and downsize the zoom lens, it is preferable to satisfy the following conditional expression (3).

$$0.7 < D2/fw < 1.3$$

Where, D2 is the thickness of the second lens group on the optical axis and fw is the focal length of the entire lens system at the short focal end.

In the above conditional expression (3), if the value exceeds the upper limit value, the thickness of the second lens group on the optical axis is increased, and the space for changing a magnification of the second lens group is reduced, so that it becomes difficult to correct the aberration of the entire zooming range. If the value is lower than the lower limit value, the space constituting the second lens group becomes too small, so that it becomes difficult to correct the aberration in the second lens group.

It is more preferable to satisfy the following conditional expression (3').

$$0.8 < D2/fw < 1.2$$

In order to further improve the performance of the zoom lens and to downsize the zoom lens, it is preferable to satisfy the following conditional expression (4).

$$0.3 < DS3w/D2Sw < 2.0$$

Where, D2Sw is the interval between the second lens group and the aperture stop at the short focal end and DS3w is the interval between the aperture stop and the third lens group at the short focal end.

If the value is lower than the lower limit value, the interval between the second lens group and the aperture stop is increased, and the height of the off-axis light beam passing through the second lens group at the short focal end becomes too high, so that it becomes difficult to correct the off-axis aberration in the second lens group, resulting in an increase in the size of the second lens group. If the value exceeds the upper limit value, the interval between the third lens group and the aperture stop is increased, and the height of the off-axis light beam passing through the third lens group at the short focal end becomes too high, so that it becomes difficult to correct the aberration in the third lens group, resulting in an increase in the size of the third lens group.

It is more preferable to satisfy the following conditional expression (4').

$$0.6 < DS3w/D2Sw < 1.5$$

In addition, it is preferable to constitute the zoom lens such that the interval between the aperture stop and the third lens group is decreased when changing a magnification from the short focal end to the long focal end.

In order to further improve the performance of the zoom lens, it is preferable for the image side surface of the positive lens of the second lens group to have a convex surface on the object side and to be an aspheric surface. If the shape of the aspheric surface is formed such that a negative power is reduced, the aberration in the second lens group can be controlled.

If the positive lens of the second lens group satisfies the following conditional expression, the performance can be further improved.

$$2.2 > Nd\_23 > 1.95$$

$$25 > \upsilon d\_23 > 15$$

Where, Nd__23 is a refractive index of d line of the positive lens (L23) of the second lens group and υd__23 is an Abbe's number according to d line of the positive lens (L23) of the second lens group.

In order to further improve the performance, is it preferable to satisfy the following conditional expression (5).

$$2.0 < |X1-2/f2| < 4.0$$

Where, X1-2 is the variation of the interval between the first lens group and the second lens group when changing a magnification from the short focal end to the long focal end and f2 is a focal length of the entire second lens group.

In the above conditional expression (5), if the value exceeds the upper limit value, the magnification by the second lens group becomes too large, and the magnification effect by the third lens group can not be obtained, so that it becomes difficult to correct the aberration of the entire zooming range. If the value is lower than the lower limit value, the magnification by the second lens group becomes too small, and it becomes necessary for the third lens group to have a large magnification, so that it becomes difficult to correct the aberration as the entire zooming range.

It is more preferable to satisfy the following conditional expression (5').

$$2.5 < |X1-2/f2| < 3.5$$

In order to improve the performance and control the effect of the eccentricity and the like, it is preferable to satisfy the following conditional expression (6).

$$0.50 < \phi 2/\phi 1 < 0.80$$

Where, φ1 is the effective light beam diameter of the object side surface of the negative lens (L21) of the second lens group and φ2 is the effective light beam diameter of the object side surface of the negative lens (L22) of the second lens group.

In the above conditional expression (6), if the value exceeds the upper limit value, the diameter of the off-axis light beam passing through the second lens group at the short focal end is increased, so that it becomes difficult to correct the off-axis aberration at the short focal end. If the value is lower than the lower limit value, the aberration generating on the image side face of the negative lens (L21) becomes too large, so that it becomes difficult to correct the aberration of the entire zooming range. The effect of the eccentricity of the image side face of the negative lens (L21) on the image quality is also increased.

It is more preferable to satisfy the following conditional expression (6').

$$0.6 < \phi 2/\phi 1 < 0.75$$

In order to downsize the zoom lens and further improve the performance of the zoom lens, it is preferable to satisfy the following conditional expression (7).

$$-1.5 < f2/fw < -0.8$$

In the above conditional expression (7), if the value exceeds the upper limit value, the power of the second lens group is too strong, so that it becomes difficult to correct the aberration in the second lens group. If the number of lenses is further increased in the second lens group, the size of the second lens group is increased. If the value is lower than the lower limit value, the power of the second lens group is weak, and the contribution to the magnification of the second lens group is reduced, so that it becomes necessary to improve the contribution to the magnification of the third lens group, and it becomes difficult to correct the aberration in the third lens group.

In order to further improve the performance of the zoom lens and downsize the zoom lens, it is preferable to satisfy the following conditional expression (8).

$$0.8 < TLt/ft < 1.5$$

Where, TLt is the entire length at the long focal end and ft is the focal length at the long focal end.

In the above conditional expression (8), if the value exceeds the upper limit value, the entire length at the long focal end is increased, so that the entire length at the long focal end becomes dominative relative to the thickness of a camera. If the value is lower than the lower limit value, a sufficient entire length at the long focal end can not be ensured, so that it becomes difficult to correct aberration at the long focal end.

By setting the opening diameter of the aperture stop to be larger at the long focal end than that of the short focal end, the change in F-number when changing a magnification can be reduced. When it is necessary to reduce the light volume which reaches the imaging plane, the aperture stop can be downsized, but it is preferable to reduce the light volume by inserting an ND filter and the like without largely changing the size of the aperture stop because the decrease in the resolution by a diffractive phenomenon can be prevented.

The focusing operation can be performed by extending the entire system, but it is preferable to perform the focusing operation only by the movement of the fourth lens group.

In the above, a basic configuration of the zoom lens according to the first embodiment of the present invention is described. Hereinafter, the details of the zoom lens according to this embodiment will be described in the after-described embodiments with reference to FIGS. 1-16 based on specific numerical examples.

Figure 17:
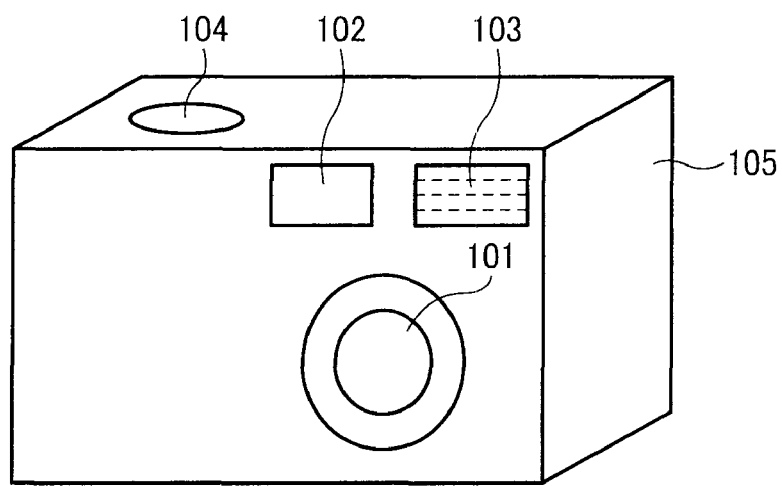
FIG. 17 is a perspective view illustrating an external appearance of a digital camera as an imaging device as seen from a subject side according to a second embodiment of the present invention.
Figure 18:
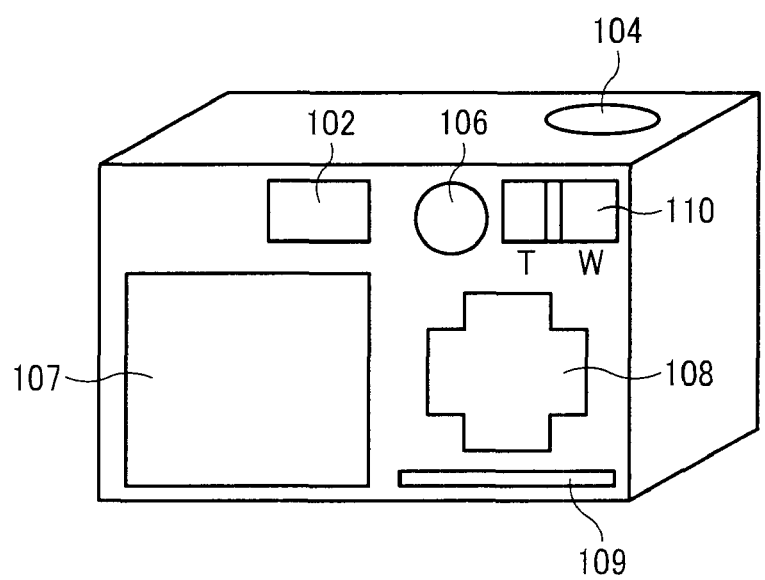
FIG. 18 is a perspective view illustrating an external appearance of the digital camera as seen from a photographer's side in FIG. 17.
Figure 19:
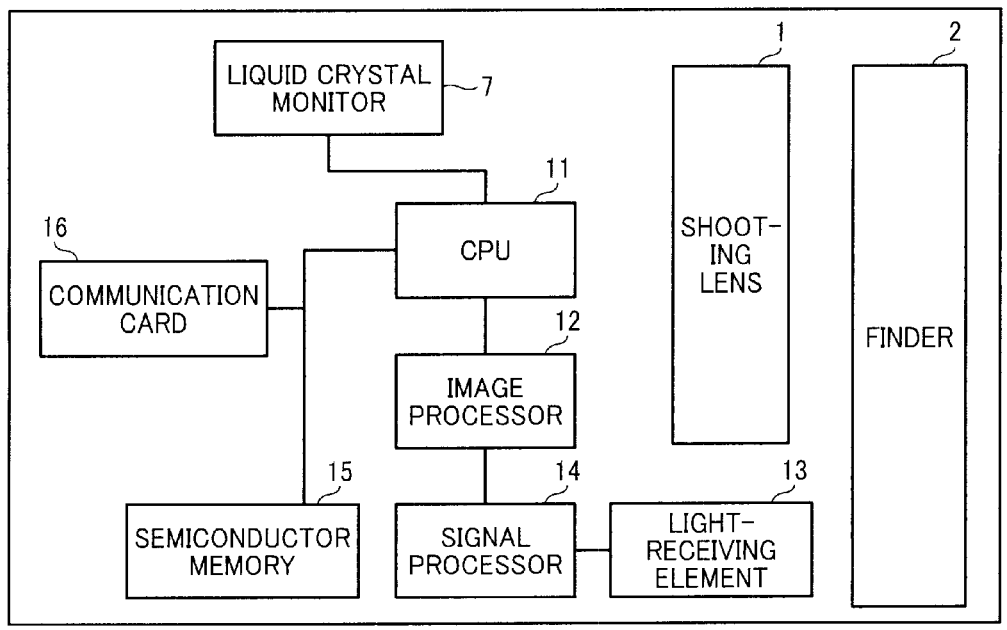
FIG. 19 is a block view illustrating a functional configuration of the digital camera in FIG. 17.

Next, a digital camera as an imaging device according to the second embodiment of the present invention in which the zoom lens according to the first embodiment of the present invention is used as an imaging optical system will be described with reference to FIGS. 17-19. FIG. 17 is a perspective view illustrating an external appearance of a digital camera as seen from a front side which is an object side, i.e., a subject side. FIG. 18 is a perspective view illustrating an external appearance of a digital camera as seen from a back side which is a photographer's side. FIG. 19 is a block view illustrating a functional configuration of the digital camera. In addition, the imaging device is described by using a digital camera as an example, but the zoom lens according to the embodiment of the present invention can be adapted for a silver salt film camera using a silver salt film as an image recording medium. Moreover, an information device having a camera function such as a portable digital assistant, for example, PDA (personal data assistant) and a cell phone is widely used. Such an information device has functions and configurations substantially similar to those in a digital camera although the external appearance is slightly different. As an imaging optical system in this information device, the zoom lens according to the embodiment of the present invention can be used.

As illustrated in FIGS. 17, 18, the digital camera includes a shooting lens 101, an optical finder 102, a strobe (flush light) 103, a shutter button 104, a camera body 105, a power source switch 106, a liquid crystal monitor 107, an operation button 108, a memory card socket 109 and a zoom switch 110. As illustrated in FIG. 19, the digital camera includes a central processing unit (CPU) 111, an image processor 112, a light-receiving element 113, a signal processor 114, a semiconductor memory 115 and a communication card 116.

The digital camera includes the shooting lens 101 as an imaging optical system and the light receiving-element 113 as an image sensor, for example, a CMOS (contemporarily metal-oxide semiconductor) and a CCD (charged-coupled device). A subject (object) optical image focused by the shooting lens 101 is read by the light-receiving element 113. As this photographing lens 101, the zoom lens according to the first embodiment of the present invention is used.

The output of the light-receiving element 113 is processed by the single processor 114 controlled by the CPU 111, and is converted into the digital image information. More specifically, such a digital camera includes a unit for converting the shot image (subject image) into digital image information. This unit is constituted by the light-receiving element 113, the signal processor 114, the CPU 111 which controls these and the like.

After a predetermined image process is performed in the image processor 112 which is controlled by the CPU 111 to the image information digitized by the signal processor 114, the image information is recorded in the semiconductor memory 115 such as a nonvolatile memory. In this case, the semiconductor memory 115 can be a memory card loaded in the memory card socket 109, and can be a semiconductor memory built in the camera body (on-board memory). The liquid crystal monitor 107 can display an image in shooting, and can display an image recorded in the semiconductor memory 115. The image recorded in the semiconductor memory 115 can be sent outside via the communication card 116 and the like loaded in a not shown communication card socket.

The object side surface of the shooting lens 101 is covered by a not shown lens barrier in a handheld state. If a user turns on the switch by operating the power source switch 106, the lens barrier opens and the object face is exposed. In this case, in the lens barrel of the shooting lens 101, the optical system of each group constituting the zoom lens is arranged at the short focal end (wide angle end), for example, and the position of the optical system of each group is changed by operating the zoom switch 110, and the operation which changes a magnification to the long focal end (telephoto end) via the intermediate focal length can be performed. In addition, it is preferable for the optical system of the optical finder 102 to change a magnification in conjugation with the changes in the field angle of the shooting lens 101.

In many cases, by half pressing the shutter button 104, the focusing is performed. The focusing in the zoom lens according to the embodiment of the present invention can be performed by the movement of a part of the groups of the optical systems of a plurality of groups constituting the zoom lens and the movement of the light receiver. If the shutter button 104 is full-pressed, the shooting is performed, and the above described process is performed afterwards.

When displaying the image recorded in the semiconductor memory 115 on the liquid crystal monitor 107 and sending outside via the communication card 116 and the like, the operation button 108 is operated as prescribed. The semiconductor memory 115, the communication card 116 and the like are loaded in a dedicated socket or a generalized socket such as the memory cart socket 109 and the communication card socket.

As described above, the shooting lens 101 constituted by using the zoom lens illustrated in the first embodiment can be used on the above-described digital camera (imaging device) or information device as an imaging optical system. Therefore, a high quality and compact digital camera (imaging device) or information device using a light-receiving element having 10 million-15 million pixels or more can be achieved.

Embodiment 1

Next, the specific embodiments of the zoom lens according to the above-described first embodiment of the present invention will be described. Embodiments 1-4 are embodiments of specific configurations according to specific numerical examples of the zoom lens according to the embodiment of the present invention. In Embodiments 1-4, the configurations and the specific numerical examples of the zoom lenses are illustrated.

In each of Embodiments 1-4, an optical element having a parallel plate disposed in the image side of the fourth lens group assumes, for example, various optical filters such as an optical low-pass filter and infrared-cut filter and cover glass (shield glass) of a light-receiving element such as a CMOS image sensor. In this case, these are called a filter and the like (FM).

The material of the lenses in each of the zoom lenses in Embodiments 1-4 is an optical glass except that the material of the positive lens of the fourth lens group in each of the zoom lenses in Embodiments 1-4 is an optical plastic.

In each of Embodiments 1-4, both of the most object side surface and the most image side surface of the second lens group, both surfaces of the most object side lens of the third lens group and the object side surface of the fourth lens group are aspheric surfaces, respectively. In addition, the aspheric surfaces in Embodiments 1-4 are described as surfaces in which each lens surface is directly made as an aspheric surface as a mold aspheric lens. However, the aspheric lens can be constituted by a hybrid aspheric surface and the like, which obtains a similar aspheric surface by providing a resin thin film forming an aspheric surface on a surface of a spherical lens.

The aberration in Embodiments 1-4 is well-corrected. The zoom lenses in Embodiments 1-4 can correspond to a light-receiving element having 10 million-15 million pixels or more. By constituting the zoom lens in accordance with the embodiment of the present invention, it is apparent from Embodiments 1-4 that a preferable image performance can be obtained while sufficiently downsizing the zoom lens.

Figure 20:
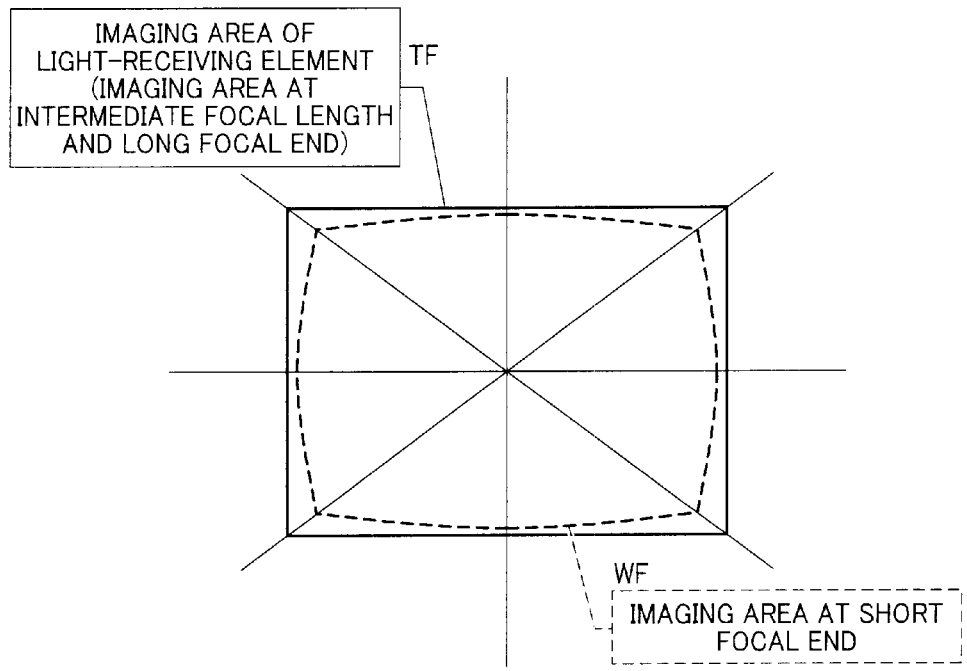
FIG. 20 is a schematic view illustrating an imaging field describing electric correction of distortion by an image process according to the embodiment of the present invention.

In addition, in the zoom lenses of Embodiments 1-4, as described above, the distortion is corrected by the image process. Namely, in the zoom lenses of Embodiments 1-4, as illustrated in FIG. 20, a barreled distortion such as an imaging area WF is generated on a light-receiving face TF of a rectangular light-receiving element at the short focal end. In addition, in FIG. 20, TF is an imaging area of a light-receiving element (imaging area at the intermediate focal length and the long focal end (telephoto end) and WF is an imaging area at the short focal end (wide angle end). On the other hand, the generation of the distortion is controlled at the intermediate focal length, the state near the intermediate focal length and the long focal end. In order to electrically correct the distortion, the effective imaging area is set to the barreled shape (WF) at the short focal end and is set to the rectangular shape (TF) at the intermediate focal length and the long focal end. The image of the effective imaging area (WF) at the short focal end is converted by the image process into rectangular image information in which the distortion is reduced. Therefore, in each of Embodiments 1-4, the image height at the short focal end is set to be smaller than the image height at the intermediate focal length and the image height at the long focal end.

In addition, the meanings of the following reference numbers in Embodiments 1-4 are as follows.

f: focal length of entire system of zoom lens
F: F-value (F-number)
ω: half-field angle
R: curvature radius
D: surface interval
Nd: refractive index
υd: Abbe's number
φ: effective light beam diameter
K: conical constant of aspheric surface
$A_4$: fourth order aspheric surface coefficient
$A_6$: sixth order aspheric surface coefficient
$A_8$: eighth order aspheric surface coefficient
$A_{10}$: tenth order aspheric surface coefficient An aspheric surface is defined by the following equation 1, where C is an inverse of a paraxial curvature radius (paraxial curvature), H is a height from an optical axis, and $A_{21}$ is displacement in the optical axis direction from a surface apex.

$$X = \frac{CH^2}{1+\sqrt{\{1-(1+K)C^2H^2\}}} + A_4 \cdot H^4 + A_6 \cdot H^6 + A_8 \cdot H^8 + A_{10} \cdot H^{10}$$ [Equation 1]

FIG. 1 is a schematic view illustrating a configuration of an optical system of a zoom lens and a zooming trajectory from the short focal end (wide angle end) to the long focal end (telephoto end) via a predetermined intermediate focal length according to Embodiment 1 of the first embodiment of the present invention; (a) illustrates a sectional view along the optical axis at the short focal end (Wide); (b) illustrates a sectional view along the optical axis at the focal length (Wide-Mean) between the short focal end and the intermediate focal length; (c) illustrates a sectional view along the optical axis at the intermediate focal length (Mean); (d) illustrates a sectional view along the optical axis at the focal length (Mean-Tele) between the intermediate focal length and the long focal end; (e) illustrates a sectional view along the optical axis at the long focal end (Tele). In addition, in FIG. 1 illustrating the lens group arrangement of Embodiment 1, the left side in the figure is the object (subject) side.

The zoom lens illustrated in FIG. 1 includes, in order from the object side, along the optical axis, a first lens group G1 having a positive refractive power, a second lens group G2 having a negative refractive power, a third lens group G3 having a positive refractive power, a fourth lens group G4 having a positive refractive power and an aperture stop AD between the second lens group G2 and the third lens group G3. The first lens group includes a first lens L11, a second lens L12 and a third lens L13. The second lens group G2 includes a first lens L21, a second lens L22 and a third lens L23. The third lens group G3 includes a first lens L31, a second lens L32 and a third lens L33. The fourth lens group G4 includes a single lens L40.

The first-fourth lens groups G1-G4 are supported by supporting frames which are common to each of the lens groups, respectively, and operate together for each lens group in zooming. The aperture stop AD operates independently from each group. In FIG. 1, the surface number of each optical surface is illustrated. In addition, the reference numbers in FIG. 1 are used for each embodiment in order to avoid description complications by the increase in the digit numbers of the reference numbers. For this reason, if the reference numbers which are common to the numbers in the figure of another embodiment are applied, these are not always common configurations to another embodiment.

When changing a magnification from the short focal end (wide angle end) to the long focal end (telephoto-end), all of the first-fourth lens groups G1-G4 are moved, so that the interval between the first lens group G1 and the second lens group G2 is increased, the interval between the second lens group G2 and the third lens group G3 is decreased, the interval between the third lens group G3 and the fourth lens group G4 is increased, and the first lens group G1 and the third lens group G3 are moved to be located closer to the object side at the long focal end than the short focal end.

The first lens group G1 includes, in order from the object side, the first lens (negative lens) L11 of a negative meniscus lens having a convex surface on the object side, the second lens (first positive lens) L12 of a biconvex positive lens having a strong convex surface on the object side and the third lens (second positive lens) L13 of a positive meniscus lens having a convex surface on the object side. The two lenses of the first lens L11 and the second lens L12 are closely attached to each other to form a cemented lens having two lenses.

The second lens group G2 includes, in order from the object side, the first lens (first negative lens) L21 which is a negative meniscus lens having a convex surface on the object side and an aspheric lens forming an aspheric surface on the object side, the second lens (second negative lens) L22 of a negative meniscus lens having a convex surface on the object side and the third lens (positive lens) L23 which is a positive meniscus lens having a convex surface on the object side and an aspheric lens forming an aspheric surface on the image side. The two lenses of the second lens L22 and the third lens L23 are closely attached to each other to form a cemented lens of the two lenses.

The aperture stop AD is arranged between the second lens group G2 and the third lens group G3. The third lens group G3 includes, in order from the object side, the first lens (first positive lens) L31 which is a biconvex positive lens having a strong convex surface on the object side and an aspheric lens forming an aspheric surface on both surfaces, the second lens (second positive lens) L32 of a biconvex positive lens having a strong convex surface on the object side and the third lens (negative lens) L33 of a biconcave negative lens having a strong concave surface on the image side. The two lenses of the second lens L32 and the third lens L33 are closely attached to each other to form a cemented lens of two lenses.

The fourth lens group G4 includes the single positive lens L40 which is a biconvex positive lens having a strong convex surface on the object side and an aspheric lens having an aspheric surface on the object side.

In this case, as illustrated in FIG. 1, when changing a magnification from the short focal end (wide angle end) to the long focal end (telephoto end), the first lens group G1 monotonically moves from the image side to the object side, the second lens group G2 moves to the image side to depict a convex trajectory, and the third lens group G3 moves to the object side from the image side, moves to the image side from the object side, and again moves to the object side from the image side, and the fourth lens group G4 moves to the object side to depict a convex trajectory.

The optical feature of each optical element in Embodiment 1 is as shown in the following Table 1.

TABLE 1

| | | | OPTICAL FEATURE | | | | | |
|---|---|---|---|---|---|---|---|---|
| SURFACE NUMBER | R | D | N | ν | φ | GLASS | REMARK | |
| 1 | 40.561 | 0.80 | 2.00069 | 25.46 | 23.0 | TAFD40 (HOYA) | L11 | G1 |
| 2 | 22.554 | 3.26 | 1.59282 | 68.63 | 21.6 | FCD505 (HOYA) | L12 | |
| 3 | −2233.709 | 0.20 | | | 21.2 | | | |
| 4 | 18.274 | 3.02 | 1.72916 | 54.68 | 18.0 | S-LAL18 (OHARA) | L13 | |
| 5 | 50.251 | VARIABLE DA | | | 17.4 | | | |
| 6* | 23.054 | 0.80 | 1.86400 | 40.58 | 10.2 | L-LAH83 (OHARA) | L21 | G2 |
| 7 | 4.131 | 2.09 | | | 7.0 | | | |
| 8 | 61.871 | 0.80 | 1.81600 | 46.62 | 6.8 | S-LAH59 (OHARA) | L22 | |
| 9 | 7.179 | 1.80 | 2.00178 | 19.32 | 6.4 | MFDS2 (HOYA) | L23 | |
| 10* | 21.315 | VARIABLE DB | | | 5.7 | | | |
| 11 | APERTURE STOP | VARIABLE DC | | | 2.9 | | AD | |
| 12* | 7.460 | 2.57 | 1.55332 | 71.68 | 7.2 | MFCD500 (HOYA) | L31 | G3 |
| 13* | −9.422 | 0.60 | | | 7.4 | | | |
| 14 | 7.650 | 2.31 | 1.59282 | 68.63 | 7.2 | FCD505 (HOYA) | L32 | |
| 15 | −16.173 | 0.80 | 1.85026 | 32.27 | 6.6 | S-LAH71 (OHARA) | L33 | |
| 16 | 5.351 | VARIABLE DD | | | 6.0 | | | |
| 17* | 10.000 | 3.33 | 1.52528 | 56.20 | 9.4 | PLASTIC | L40 | G4 |
| 18 | −74.577 | VARIABLE DE | | | 9.2 | | | |
| 19 | ∞ | 0.80 | 1.50000 | 64.00 | 8.6 | FILTER | FM | |
| 20 | ∞ | — | | | 8.6 | | | |

In Table 1, "*" indicates an aspheric surface, and "HOYA" and "OHARA" indicate the names of the glass makers of HOYA INC. and OHARA INC., respectively.

These are the same in another embodiment.

Namely, in Table 1, each optical surface of the sixth, tenth, twelfth, thirteenth and seventeenth surfaces to which "*" is applied is an aspheric surface, and parameters of each aspheric surface in the equation 1 are as shown in the following Table 2.

TABLE 2

ASPHERIC SURFACE COEFFICIENT

| | K | A4 | A6 | A8 | A10 |
|---|---|---|---|---|---|
| 6 | 0 | −3.59577E−04 | 2.88790E−06 | 1.05189E−07 | −2.41047E−09 |
| 10 | 0 | −7.38687E−04 | −4.12163E−06 | 5.00682E−07 | −9.07816E−08 |
| 12 | 0 | −6.50523E−04 | 2.94728E−05 | −2.54075E−06 | 1.16148E−07 |
| 13 | 0 | 1.73404E−04 | 4.00476E−05 | −3.54538E−06 | 1.57333E−07 |
| 17 | 0 | −5.77707E−05 | 4.41283E−06 | −1.53886E−07 | 2.60428E−09 |

In Embodiment 1, the focal length of the entire optical system, f, F-number, F, the variable interval between the first and second lens groups G1, G2, DA, the variable interval DB between the second lens group G2 and the aperture stop AD, the variable interval DC between the aperture stop AD and the third lens group G3, the variable interval DD between the third and fourth lens groups G3, G4, and the variable interval DE between the fourth lens group G4 and the filter FM and the like are changed as shown in the following Table 3 with zooming.

TABLE 3

VARIABLE INTERVAL

| | SHORT FOCAL END (Wide) | SHORT-INTER-MEDIATE (W-M) | INTER-MEDIATE FOCAL LENGTH (Mean) | INTER-MEDIATE-LONG (M-T) | LONG FOCAL END (Tele) |
|---|---|---|---|---|---|
| f | 5.05 | 9.00 | 16.01 | 29.02 | 52.01 |
| F-NUMBER | 3.47 | 4.42 | 4.73 | 5.00 | 5.47 |
| ω | 39.83 | 25.21 | 14.65 | 8.09 | 4.44 |
| DA | 0.600 | 4.643 | 9.545 | 15.014 | 17.226 |
| DB | 6.484 | 4.379 | 1.614 | 0.800 | 0.800 |
| DC | 6.243 | 4.134 | 3.745 | 2.605 | 0.950 |
| DD | 3.740 | 5.356 | 4.599 | 4.055 | 11.440 |
| DE | 2.450 | 4.008 | 6.530 | 6.117 | 2.376 |

The opening diameter of the aperture stop AD at the long focal (Tele) end is $\phi 3.6$, and this image height Y'=4.1. Referring to FIG. 20, as described above, in order to correct the distortion by the image process, the imaging area at the long focal end (intermediate focal length) substantially conforms to the imaging area of the light-receiving element to obtain the rectangular imaging area, and at the short focal (Wide) end, the distortion is generated such that the imaging area at the short focal end becomes a barreled shape as Y'=3.75. Then, the image of the barreled effective imaging area at the short focal end is converted by the image process into rectangular image information in which the distortion is reduced.

Accordingly, the values corresponding to the conditional expressions (1)-(8) are as shown in the following Table 4, and satisfy the following conditional expressions (1)-(8).

TABLE 4

CONDITION EXPRESSION

| CONDITION EXPRESSION (1) | f21/f22 | 0.59 |
|---|---|---|

TABLE 4-continued

CONDITION EXPRESSION

| CONDITION EXPRESSION (2) | f21/f2 | 1.10 |
|---|---|---|

TABLE 4-continued

CONDITION EXPRESSION

| CONDITION EXPRESSION (3) | D2/fw | 1.09 |
|---|---|---|
| CONDITION EXPRESSION (4) | DS3w/D2Sw | 0.96 |
| CONDITION EXPRESSION (5) | |X1 − 2/f2| | 3.08 |
| CONDITION EXPRESSION (6) | φ2/φ1 | 0.67 |
| CONDITION EXPRESSION (7) | f2/fw | −1.07 |
| CONDITION EXPRESSION (8) | TLt/ft | 1.10 |

Figure 2:
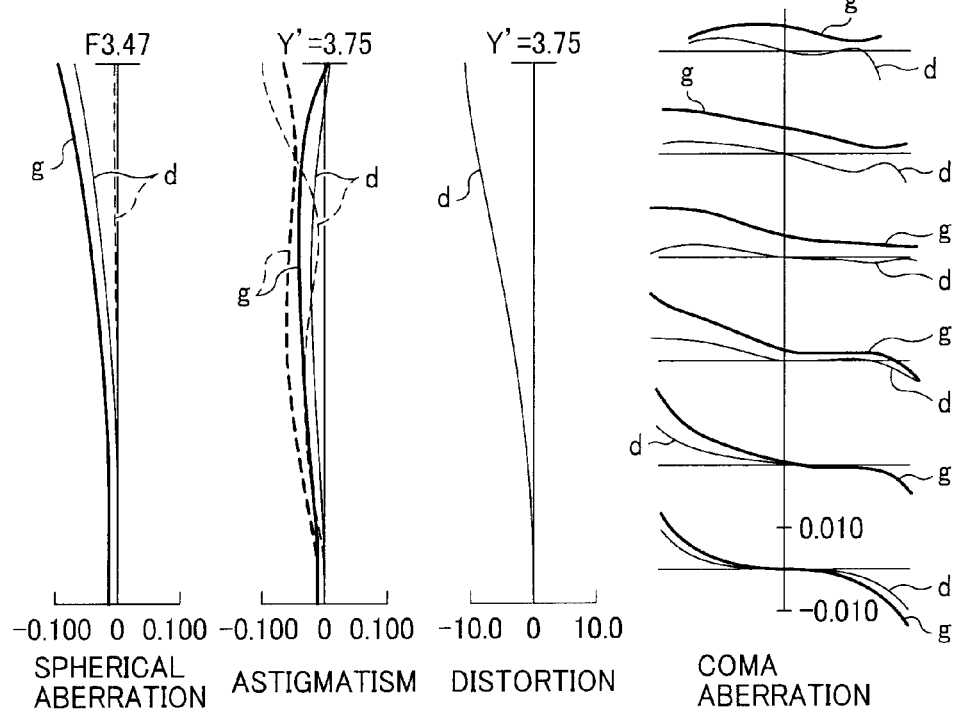
FIG. 2 is a view illustrating aberration curves of spherical aberration, astigmatism, distortion and coma aberration in the zoom lens according to Embodiment 1 illustrated in FIG. 1 at a short focal end (wide angle end).
Figure 3:
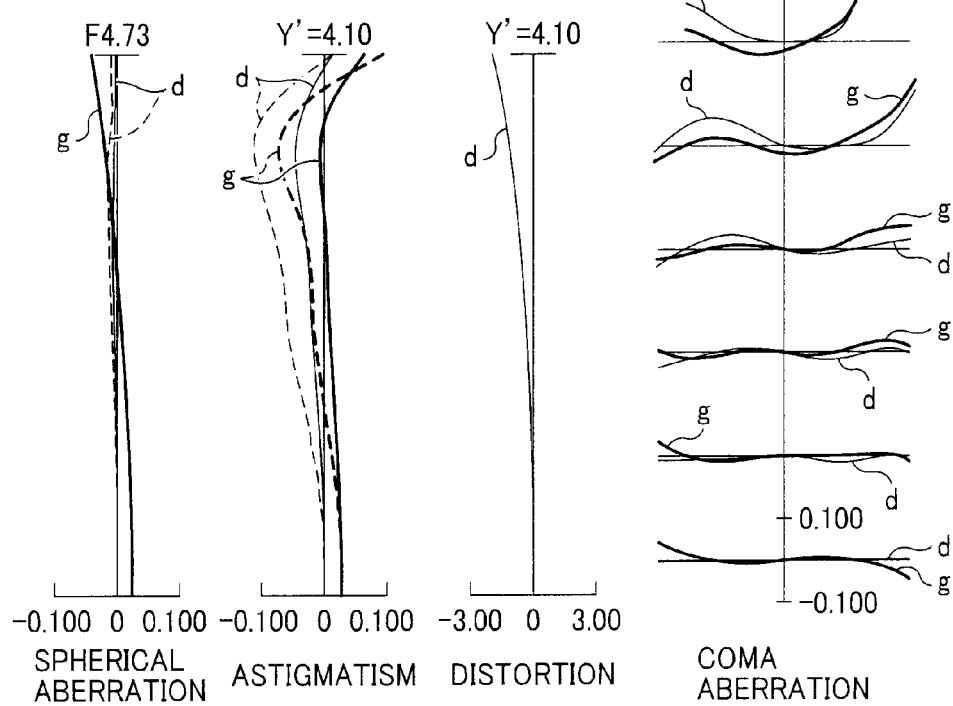
FIG. 3 is a view illustrating aberration curves of spherical aberration, astigmatism, distortion and coma aberration in the zoom lens according to Embodiment 1 illustrated in FIG. 1 at an intermediate focal length.
Figure 4:
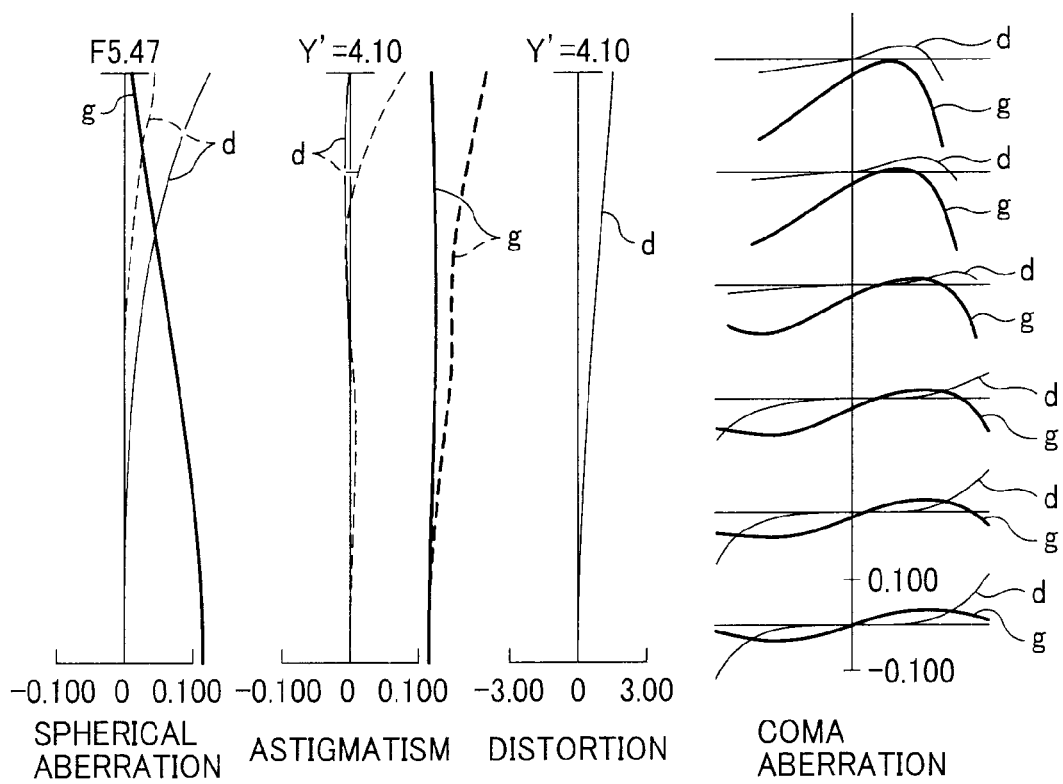
FIG. 4 is a view illustrating aberration curves of spherical aberration, astigmatism, distortion and coma aberration in the zoom lens according to Embodiment 1 illustrated in FIG. 1 at a long focal end (telephoto end).

FIGS. 2, 3, 4 illustrate aberrations views of coma aberration, distortion, astigmatism and spherical aberration at the wide angle end, the intermediate focal length and the telephoto end in Embodiment 1. In these views, the dashed line in the spherical aberration represents a sine condition and the solid line and the dashed line in the astigmatism represent sagittal and meridional, respectively. The reference numbers g, d in the aberration views of the spherical aberration, the astigmatism and the coma aberration represent g line and d line, respectively. These are the same as the aberration views in another embodiment.

Embodiment 2

Figure 5:
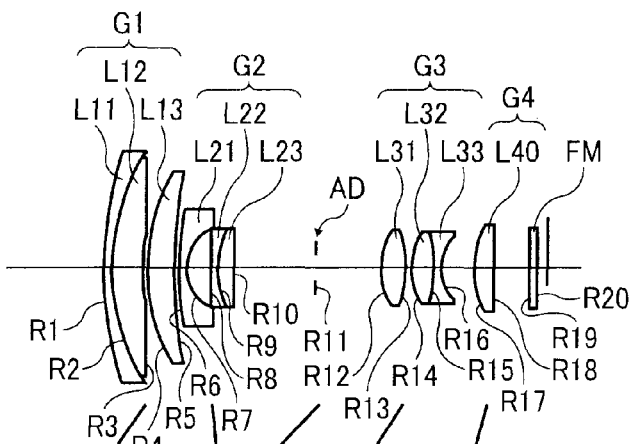
FIG. 5 is a schematic view illustrating a configuration of an optical system of a zoom lens and a zooming trajectory according to Embodiment 2 of the first embodiment of the present invention.
Figure 5:
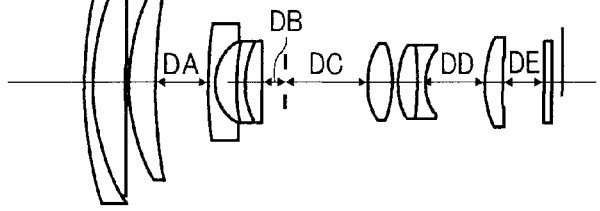
Figure 5:
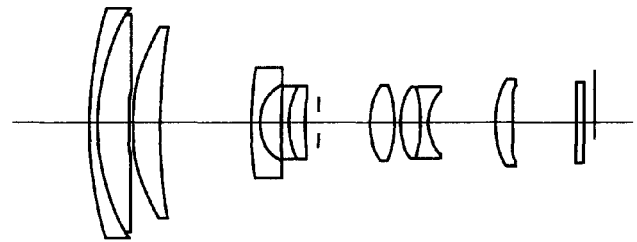
Figure 5:
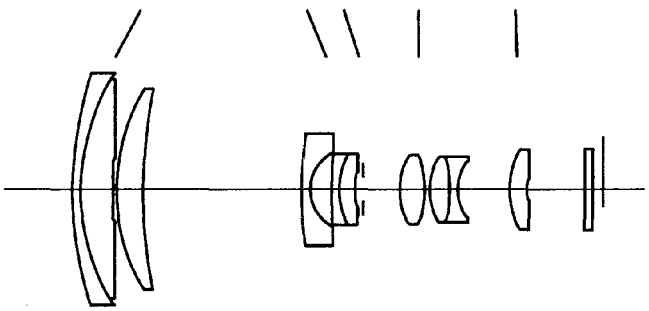
Figure 5:
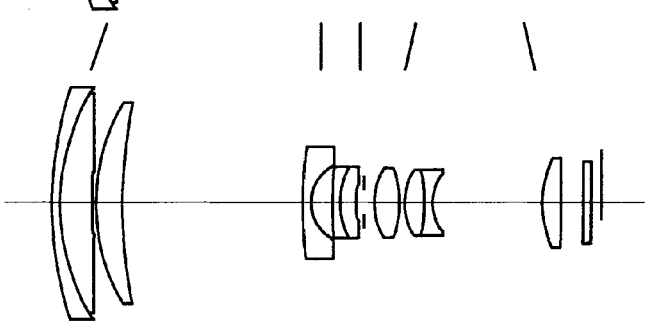

FIG. 5 is a schematic view illustrating a configuration of an optical system of a zoom lens and a zooming trajectory from the short focal end (wide angle end) to the long focal end (telephoto end) via a predetermined intermediate focal length according to Embodiment 2 of the first embodiment of the present invention; (a) illustrates a sectional view along the optical axis at the short focal end (Wide); (b) illustrates a sectional view along the optical axis at the focal length (Wide-Mean) between the short focal end and the intermediate focal length; (c) illustrates a sectional view along the optical axis at the intermediate focal length (Mean); (d) illustrates a sectional view along the optical axis at the focal length (Mean-Tele) between the intermediate focal length and the long focal end; (e) illustrates a sectional view along the optical axis at the long focal end (Tele). In FIG. 5 illustrating the lens group arrangement in Embodiment 2, the left side of the figure is the object side.

The zoom lens illustrated in FIG. 5 includes, in order from the object side, along the optical axis, a first lens group G1 having a positive refractive power, a second lens group G2 having a negative refractive power, a third lens group G3 having a positive refractive power, a fourth lens group G4 having a positive refractive power and an aperture stop AD between the second and third lens groups G2, G3. The first lens group G1 includes a first lens L11, a second lens L12 and a third lens L13. The second lens group G2 includes a first lens L21, a second lens L22 and a third lens L23. The third lens group G3 includes a first lens L31, a second lens L32 and a third lens L33. The fourth lens group G4 includes a single lens L40.

The first-fourth lens groups G1-G4 are supported by supporting frames which are common to each of the lens groups, respectively, and operate together for each lens group in zooming. The aperture stop AD operates independently from each group. In FIG. 5, the surface number of each optical surface is illustrated. In addition, the reference numbers in FIG. 5 are used for each embodiment in order to avoid description complications by the increase in the digit numbers of the reference numbers. For this reason, if the reference numbers which are common to the numbers in the figure of another embodiment are applied, these are not always common configurations to another embodiment.

When changing a magnification from the short focal end to the long focal end, all of the first-fourth lens groups G1-G4 are moved, so that the interval between the first lens group G1 and the second lens group G2 is increased, the interval between the second lens group G2 and the third lens group G3 is decreased, the interval between the third lens group G3 and the fourth lens group G4 is increased, and the first lens group G1 and the third lens group G3 are moved to be located closer to the object side at the long focal end than the short focal end.

The first lens group G1 includes, in order from the object side, the first lens (negative lens) L11 of a negative meniscus lens having a convex surface on the object side, the second lens (first positive lens) L12 of a positive meniscus lens having a convex surface on the object side and the third lens (second positive lens) L13 of a positive meniscus lens having a convex surface on the object side. The two lenses of the first lens L11 and the second lens L12 are closely attached to each other to form a cemented lens having two lenses.

The second lens group G2 includes, in order from the object side, the first lens (first negative lens) L21 which is a negative meniscus lens having a convex surface on the object side and an aspheric lens forming an aspheric surface on the object side, the second lens (second negative lens) L22 of a negative meniscus lens having a convex surface on the object side and the third lens (positive lens) L23 which is a positive meniscus lens having a convex surface on the object side and an aspheric lens forming an aspheric surface on the image side. The two lenses of the second lens L22 and the third lens L23 are closely attached to each other to form a cemented lens of the two lenses.

The aperture stop AD is arranged between the second and third lens groups G2, G3.

The third lens group G3 includes, in order from the object side, the first lens (first positive lens) L31 which is a biconvex positive lens having a strong convex surface on the object side and an aspheric lens forming an aspheric surface on both surfaces, the second lens (second positive lens) L32 of a biconvex positive lens having a strong convex surface on the object side and the third lens (negative lens) L33 having a biconcave negative lens having a strong concave surface on the image side. The two lenses of the second lens L32 and the third lens L33 are closely attached to each other to form a cemented lens of two lenses.

The fourth lens group G4 includes the single positive lens L40 which is a positive meniscus lens having a convex surface on the object side and an aspheric lens having an aspheric surface on the object side.

In this case, as illustrated in FIG. 5, when changing a magnification from the short focal end (wide angle end) to the long focal end (telephoto end), the first lens group G1 monotonically moves from the image side to the object side, the second lens group G2 moves to the image side to depict a convex trajectory, and the third lens group G3 moves to the object side from the image side, moves to the image side from the object side, and again moves to the object side from the image side, and the fourth lens group G4 moves to the object side to depict a convex trajectory.

The optical feature of each optical element in Embodiment 2 is as shown in the following Table 5.

TABLE 5

| SURFACE NUMBER | R | D | N | ν | φ | GLASS | REMARK | |
|---|---|---|---|---|---|---|---|---|
| 1 | 40.310 | 0.80 | 2.00069 | 25.46 | 24.0 | TAFD40 (HOYA) | L11 | G1 |
| 2 | 23.189 | 3.45 | 1.59282 | 68.63 | 22.6 | FCD505 (HOYA) | L12 | |
| 3 | 772.480 | 0.20 | | | 22.0 | | | |
| 4 | 19.647 | 2.83 | 1.72916 | 54.68 | 20.0 | S-LAL18 (OHARA) | L13 | |
| 5 | 52.995 | VARIABLE DA | | | 19.6 | | | |
| 6* | 40.667 | 0.80 | 1.86400 | 40.58 | 11.6 | L-LAH83 (OHARA) | L21 | G2 |
| 7 | 4.559 | 2.26 | | | 8.0 | | | |
| 8 | 30.349 | 0.80 | 1.81600 | 46.62 | 7.8 | S-LAH59 (OHARA) | L22 | |
| 9 | 8.466 | 1.69 | 2.00178 | 19.32 | 7.4 | MFDS2 (HOYA) | L23 | |
| 10* | 25.433 | VARIABLE DB | | | 7.0 | | | |
| 11 | APERTURE STOP | VARIABLE DC | | | 2.8 | | AD | |
| 12* | 7.306 | 2.56 | 1.55332 | 71.68 | 7.2 | MFCD500 (HOYA) | L31 | G3 |
| 13* | −9.884 | 0.67 | | | 7.4 | | | |
| 14 | 8.536 | 1.99 | 1.59282 | 68.63 | 7.0 | FCD505 (HOYA) | L32 | |
| 15 | −19.863 | 0.83 | 1.85026 | 32.27 | 6.6 | S-LAH71 (OHARA) | L33 | |
| 16 | 5.610 | VARIABLE DD | | | 6.0 | | | |
| 17* | 10.978 | 1.92 | 1.52528 | 56.20 | 8.8 | PLASTIC | L40 | G4 |
| 18 | 301.021 | VARIABLE DE | | | 8.8 | | | |
| 19 | ∞ | 0.80 | 1.50000 | 64.00 | 8.4 | FILTER | FM | |
| 20 | ∞ | — | | | 8.4 | | | |

In Table 5, "*" indicates an aspheric surface, and "HOYA" and "OHARA" indicate the names of the glass makers of HOYA INC. and OHARA INC., respectively.

These are the same in another embodiment.

Namely, in Table 5, each optical surface of the sixth, tenth, twelfth, thirteenth and seventeenth surfaces to which "*" is applied is an aspheric surface, and parameters of each aspheric surface in the equation 1 are as shown in the following Table 6.

TABLE 6

ASPHERIC SURFACE COEFFICIENT

| | K | A4 | A6 | A8 | A10 |
|---|---|---|---|---|---|
| 6 | 0 | −1.55548E−04 | 3.71202E−06 | −5.52669E−08 | 4.22128E−10 |
| 10 | 0 | −5.18794E−04 | 1.81659E−06 | −5.38944E−07 | −1.23131E−08 |
| 12 | 0 | −6.41712E−04 | 2.82143E−05 | −2.79043E−06 | 1.16780E−07 |
| 13 | 0 | 1.75023E−04 | 3.95581E−05 | −3.73008E−06 | 1.51988E−07 |
| 17 | 0 | −1.64923E−05 | 3.14180E−07 | 8.55118E−08 | −1.87844E−09 |

In Embodiment 2, the focal length of the entire optical system, f, F-number, F, the half-field angle, ω, the variable interval DA between the first and second lens groups G1, G2, the variable interval DB between the second lens group G2 and the aperture stop AD, the variable interval DC between the aperture stop AD and the third lens group G3, the variable interval DD between the third and fourth lens groups G3, G4, and the variable interval DE between the fourth lens group G4 and the filter FM and the like are changed as shown in the following Table 7 with zooming.

TABLE 7

VARIABLE INTERVAL

| | SHORT FOCAL END (Wide) | SHORT-INTER-MEDIATE (W-M) | INTER-MEDIATE FOCAL LENGTH (Mean) | INTER-MEDIATE-LONG (M-T) | LONG FOCAL END (Tele) |
|---|---|---|---|---|---|
| f | 5.05 | 9.01 | 16.00 | 29.00 | 52.01 |
| F-NUMBER | 3.83 | 3.84 | 5.06 | 5.24 | 5.60 |
| ω | 39.81 | 24.90 | 14.57 | 8.11 | 4.42 |
| DA | 0.600 | 5.527 | 9.643 | 16.533 | 18.902 |
| DB | 8.500 | 2.466 | 1.357 | 0.800 | 0.800 |
| DC | 6.907 | 8.520 | 5.380 | 3.784 | 0.950 |
| DD | 3.500 | 6.097 | 6.866 | 5.331 | 11.359 |
| DE | 3.720 | 4.058 | 6.422 | 5.906 | 2.304 |

The opening diameter of the aperture stop AD at the long focal (Tele) end is φ3.6, and this image height Y'=4.1. Referring to FIG. 20, as described above, in order to correct the distortion by the image process, the imaging area at the long focal end (intermediate focal length) substantially conforms to the imaging area of the light-receiving element to obtain the rectangular imaging area, and at the short focal end (Wide), the distortion is generated such that the imaging area at the short focal end becomes a barreled shape as Y'=3.75. Then, the image of the barreled effective imaging area at the short focal end is converted by the image process into rectangular image information in which the distortion is reduced.

Accordingly, the values corresponding to the conditional expressions (1)-(8) are as shown in the following Table 8, and satisfy the following conditional expressions (1)-(8).

TABLE 8

CONDITION EXPRESSION

| CONDITION EXPRESSION (1) | f21/f22 | 0.41 |
|---|---|---|
| CONDITION EXPRESSION (2) | f21/f2 | 0.95 |
| CONDITION EXPRESSION (3) | D2/fw | 1.10 |
| CONDITION EXPRESSION (4) | DS3w/D2Sw | 0.81 |
| CONDITION EXPRESSION (5) | |X1 − 2/f2| | 2.89 |
| CONDITION EXPRESSION (6) | φ2/φ1 | 0.67 |
| CONDITION EXPRESSION (7) | f2/fw | −1.25 |
| CONDITION EXPRESSION (8) | TLt/ft | 1.09 |

Figure 6:
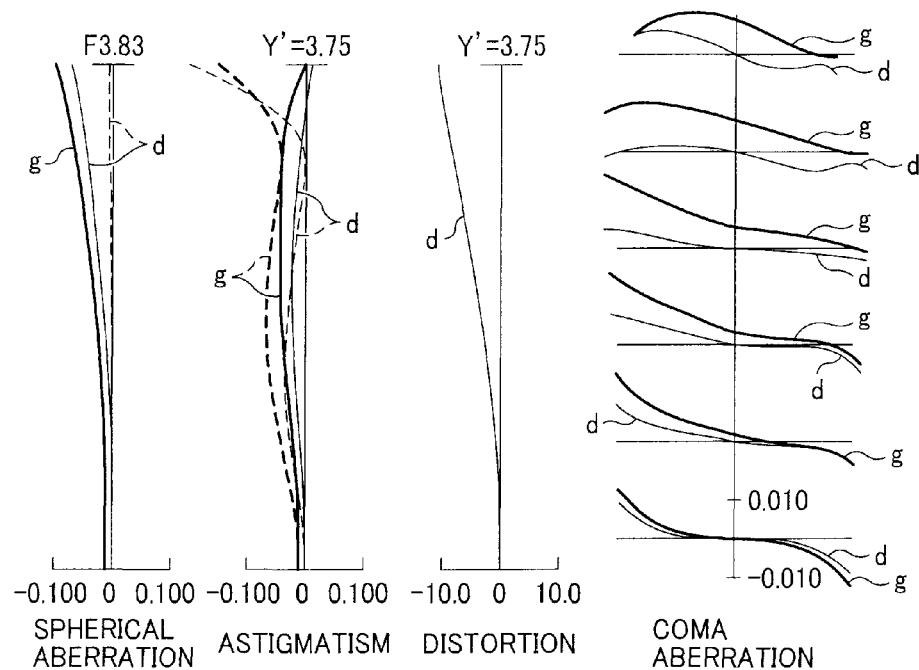
FIG. 6 is a view illustrating aberration curves of spherical aberration, astigmatism, distortion and coma aberration in the zoom lens according to Embodiment 2 illustrated in FIG. 5 at a short focal end (wide angle end).
Figure 7:
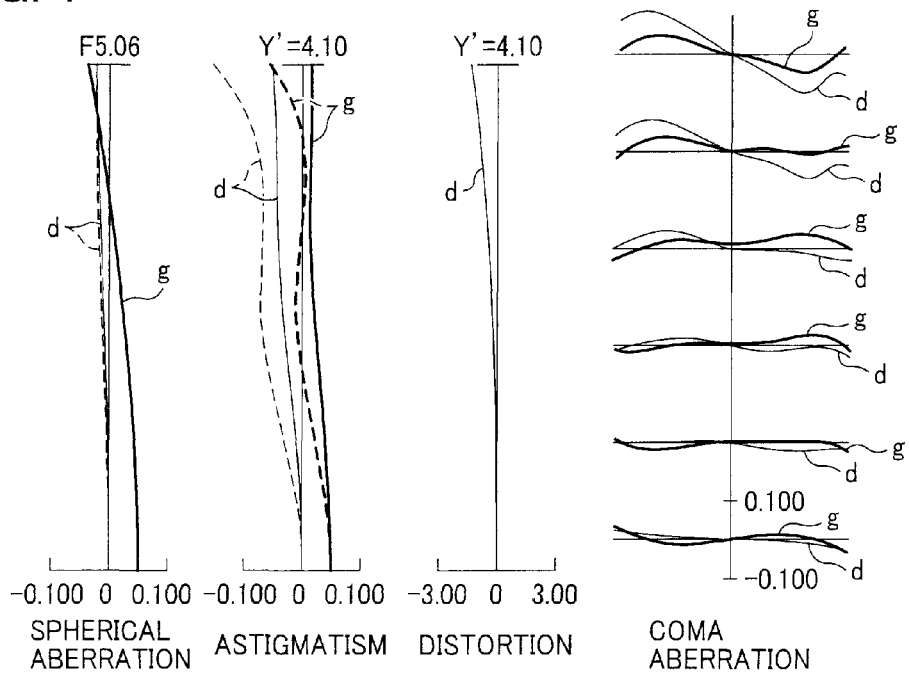
FIG. 7 is a view illustrating aberration curves of spherical aberration, astigmatism, distortion and coma aberration in the zoom lens according to Embodiment 2 illustrated in FIG. 5 at an intermediate focal length.
Figure 8:
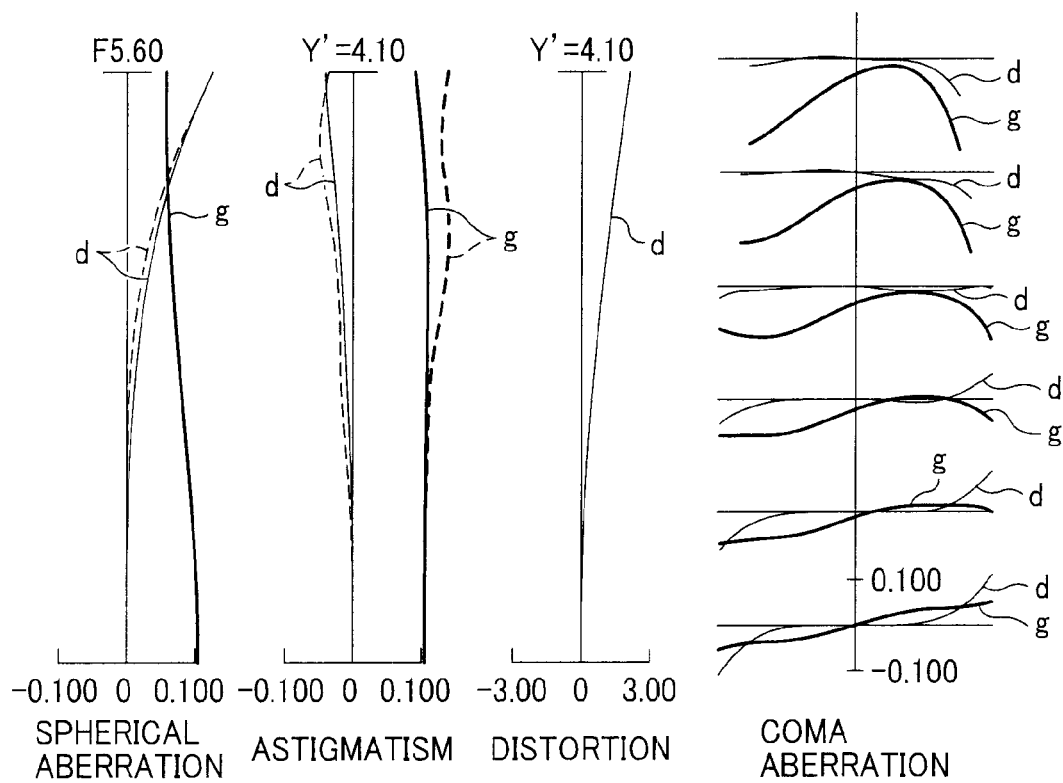
FIG. 8 is a view illustrating aberration curves view of spherical aberration, astigmatism, distortion and coma aberration in the zoom lens according to Embodiment 2 illustrated in FIG. 5 at a long focal end (telephoto end).

FIGS. 6, 7, 8 illustrate aberrations views of coma aberration, distortion, astigmatism and spherical aberration at the wide angle end, the intermediate focal length and the telephoto end in Embodiment 2. In these views, the dashed line in the spherical aberration represents a sine condition and the solid line and the dashed line in the astigmatism represent sagittal and meridional, respectively. The reference numbers g, d in the aberration views of the spherical aberration, the astigmatism and the coma aberration represent g line and d line, respectively. These are the same as the aberration views in another embodiment.

Embodiment 3

Figure 9:
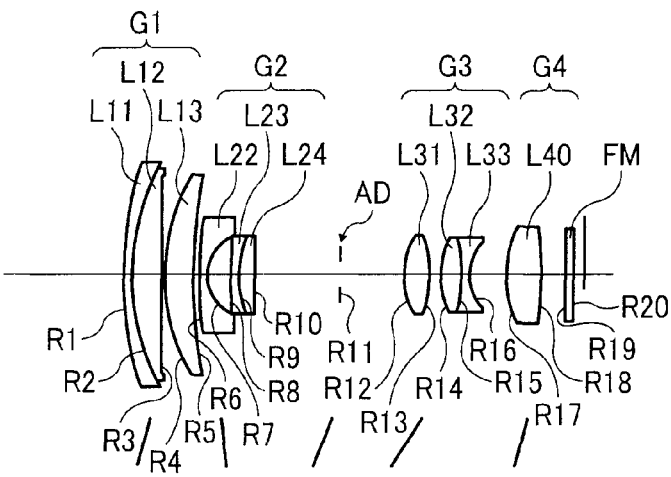
FIG. 9 is a schematic view illustrating a configuration of an optical system of a zoom lens and a zooming trajectory according to Embodiment 3 of the first embodiment of the present invention.
Figure 9:
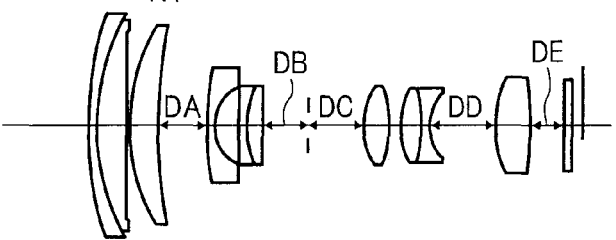
Figure 9:
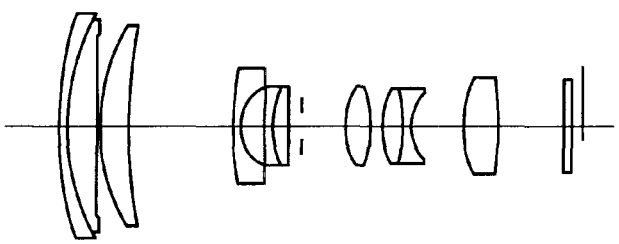
Figure 9:
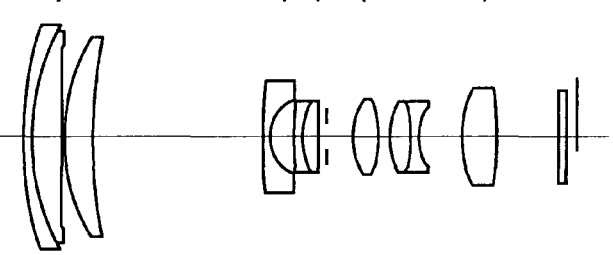
Figure 9:
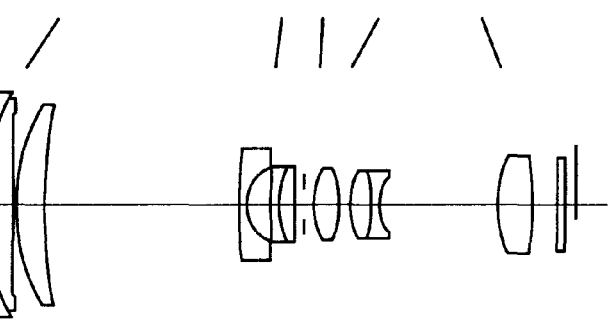

FIG. 9 is a schematic view illustrating a configuration of an optical system of a zoom lens and a zooming trajectory from the short focal end (wide angle end) to the long focal end (telephoto end) via a predetermined intermediate focal length according to Embodiment 3 of the first embodiment of the present invention; (a) illustrates a sectional view along the optical axis at the short focal end (Wide); (b) illustrates a sectional view along the optical axis at the focal length (Wide-Mean) between the short focal end and the intermediate focal length; (c) illustrates a sectional view along the optical axis at the intermediate focal length (Mean); (d) illustrates a sectional view along the optical axis at the focal length (Mean-Tele) between the intermediate focal length and the long focal end; (e) illustrates a sectional view along the optical axis at long focal end (Tele). In FIG. 9 illustrating the lens group arrangement of Embodiment 3, the left side of the figure is the object side.

The zoom lens illustrated in FIG. 9 includes, in order from the object side, along the optical axis, a first lens group G1 having a positive refractive power, a second lens group G2 having a negative refractive power, a third lens group G3 having a positive refractive power, a fourth lens group G4 having a positive refractive power and an aperture stop AD between the second and third lens groups G2, G3. The first lens group G1 includes a first lens L11, a second lens L12 and a third lens L13. The second lens group G2 includes a first lens L21, a second lens L22 and a third lens L23. The third lens group G3 includes a first lens L31, a second lens L32 and a third lens L33. The fourth lens group G4 includes a single lens L40.

When changing a magnification from the short focal end to the long focal end, all of the first-fourth lens groups G1-G4 are moved, so that the interval between the first lens group G1 and the second lens group G2 is increased, the interval between the second lens group G2 and the third lens group G3 is decreased, the interval between the third lens group G3 and the fourth lens group G4 is increased, and the first lens group G1 and the third lens group G3 are moved to be located closer to the object side at the long focal end than the short focal end.

The first lens group G1 includes, in order from the object side, the first lens (negative lens) L11 of a negative meniscus lens having a convex surface on the object side, the second lens (first positive lens) L12 of a positive meniscus lens having a convex surface on the object side and the third lens (second positive lens) L13 of a positive meniscus lens having a convex surface on the object side. The two lenses of the first lens L11 and the second lens L12 are closely attached to each other to form a cemented lens having two lenses.

The second lens group G2 includes, in order from the object side, the first lens (first negative lens) L21 which is a negative meniscus lens having a convex surface on the object side and an aspheric lens forming an aspheric surface on the object side, the second lens (second negative lens) L22 of a negative meniscus lens having a convex surface on the object side and the third lens (positive lens) L23 which is a positive meniscus lens having a convex surface on the object side and an aspheric lens forming an aspheric surface on the image side. The two lenses of the second lens L22 and the third lens L23 are closely attached to form a cemented lens of the two lenses.

The aperture stop AD is arranged between the second and third lens groups G2, G3.

The third lens group G3 includes, in order from the object side, the first lens (first positive lens) L31 which is a biconvex positive lens having a strong convex surface on the object side and an aspheric lens forming an aspheric surface on both surfaces, the second lens (second positive lens) L32 of a biconvex positive lens having a strong convex surface on the object side, and the third lens (negative lens) L33 of a biconcave negative lens having a strong concave surface on the image side. The two lenses of the second lens L32 and the third lens L33 are closely attached to each other to form a cemented lens of two lenses.

The fourth lens group G4 includes the single positive lens L40 which is a biconvex positive lens having a strong convex surface on the object side and an aspheric lens having an aspheric surface on the object side.

In this case, as illustrated in FIG. 9, when changing a magnification from the short focal end (wide angle end) to the long focal end (telephoto end), the first lens group G1 monotonically moves from the image side to the object side, the second lens group G2 moves to the image side to depict a convex trajectory, and the third lens group G3 moves to the object side from the image side, moves to the image side from the object side, and again moves to the object side from the image side, and the fourth lens group G4 moves to the object side to depict a convex trajectory.

The optical feature of each optical element in Embodiment 3 is as shown in the following Table 9.

TABLE 9

| SURFACE NUMBER | R | D | N | ν | φ | GLASS | REMARK | |
|---|---|---|---|---|---|---|---|---|
| 1 | 39.385 | 0.80 | 2.00069 | 25.46 | 22.0 | TAFD40 (HOYA) | L11 | G1 |
| 2 | 23.268 | 3.02 | 1.59282 | 68.63 | 21.0 | FCD505 (HOYA) | L12 | |
| 3 | 447.036 | 0.20 | | | 20.8 | | | |
| 4 | 19.984 | 2.93 | 1.72916 | 54.68 | 19.4 | S-LAL18 (OHARA) | L13 | |
| 5 | 51.283 | VARIABLE DA | | | 18.8 | | | |
| 6* | 64.922 | 0.80 | 1.86400 | 40.58 | 11.2 | L-LAH83 (OHARA) | L21 | G2 |
| 7 | 4.417 | 2.33 | | | 7.8 | | | |
| 8 | 35.355 | 0.80 | 1.81600 | 46.62 | 7.6 | S-LAH59 (OHARA) | L22 | |
| 9 | 10.095 | 1.64 | 2.00178 | 19.32 | 7.4 | MFDS2 (HOYA) | L23 | |
| 10* | 42.774 | VARIABLE DB | | | 7.0 | | | |
| 11 | APERTURE STOP | VARIABLE DC | | | 3.1 | | AD | |
| 12* | 7.015 | 2.63 | 1.55332 | 71.68 | 7.2 | MFCD500 (HOYA) | L31 | G3 |
| 13* | −9.753 | 1.19 | | | 7.4 | | | |
| 14 | 9.961 | 2.08 | 1.59282 | 68.63 | 6.8 | FCD505 (HOYA) | L32 | |
| 15 | −11.411 | 0.80 | 1.85026 | 32.27 | 6.4 | S-LAH71 (OHARA) | L33 | |
| 16 | 5.787 | VARIABLE DD | | | 6.0 | | | |
| 17* | 10.555 | 3.56 | 1.52528 | 56.20 | 9.4 | PLASTIC | L40 | G4 |
| 18 | −39.989 | VARIABLE DE | | | 9.2 | | | |
| 19 | ∞ | 0.80 | 1.50000 | 64.00 | 8.6 | FILTER | FM | |
| 20 | ∞ | — | | | 8.6 | | | |

In Table 9, "*" indicates an aspheric surface, and "HOYA" and "OHARA" indicate the names of the glass makers of HOYA INC. and OHARA INC., respectively.

side and an aspheric lens forming an aspheric surface on the object side, the second lens (second negative lens) L22 of a negative meniscus lens having a convex surface on the object side and the third lens (positive lens) L23 which is a positive meniscus lens having a convex surface on the object side and an aspheric lens forming an aspheric surface on the image These are the same in another embodiment.

Namely, in Table 9, each optical surface of the sixth, tenth, twelfth, thirteenth and seventeenth surfaces to which "*" is applied is an aspheric surface, and parameters of each aspheric surface in the equation 1 are as shown in the following Table 10.

TABLE 10

ASPHERIC SURFACE COEFFICIENT

|    | K | A4           | A6          | A8           | A10          |
|----|---|--------------|-------------|--------------|--------------|
| 6  | 0 | -2.01225E-07 | 3.03676E-06 | -9.28013E-08 | 8.85457E-10  |
| 10 | 0 | -4.71631E-04 | 1.31394E-06 | -4.32224E-07 | -3.24959E-08 |
| 12 | 0 | -7.00887E-04 | 3.06337E-05 | -2.76257E-06 | 1.25320E-07  |
| 13 | 0 | 1.92836E-04  | 4.13616E-05 | -3.68036E-06 | 1.65944E-07  |
| 17 | 0 | -9.81990E-05 | 3.85346E-06 | -8.48706E-08 | 7.29562E-10  |

In Embodiment 3, the focal length of the entire optical system, f, F-number, F, the half-field angle, ω, the variable interval DA between the first and second lens groups G1, G2, the variable interval DB between the second lens group G2 and the aperture stop AD, the variable interval DC between the aperture stop AD and the third lens group G3, the variable interval DD between the third and fourth lens groups G3, G4, and the variable interval DE between the fourth lens group G4 and the filter FM and the like are changed as shown in the following Table 11 with zooming.

TABLE 11

VARIABLE INTERVAL

|          | SHORT FOCAL END (Wide) | SHORT-INTER-MEDIATE (W-M) | INTER-MEDIATE FOCAL LENGTH (Mean) | INTER-MEDIATE-LONG (M-T) | LONG FOCAL END (Tele) |
|----------|------|-------|--------|--------|--------|
| f        | 5.05 | 9.00  | 16.00  | 29.01  | 52.03  |
| F-NUMBER | 3.59 | 4.30  | 4.64   | 5.04   | 5.87   |
| ω        | 39.39| 24.55 | 14.48  | 8.08   | 4.44   |
| DA       | 0.600| 4.963 | 10.414 | 17.010 | 19.630 |
| DB       | 8.500| 4.556 | 1.203  | 0.800  | 0.800  |
| DC       | 6.387| 5.538 | 4.464  | 2.622  | 0.950  |
| DD       | 3.500| 6.322 | 5.037  | 4.135  | 11.652 |
| DE       | 2.437| 3.305 | 6.487  | 6.111  | 2.318  |

The opening diameter of the aperture stop AD at the long focal end (Tele) is φ3.6, and this image height Y'=4.1. Referring to FIG. 20, as described above, in order to correct the distortion by the image process, the imaging area at the long focal end (intermediate focal length) substantially conforms to the imaging area of the light-receiving element to obtain the rectangular imaging area, and at the short focal (Wide) end, the distortion is generated such that the imaging area at the short focal end becomes a barreled shape as Y'=3.85. Then, the image of the barreled effective imaging area at the short focal end is converted by the image process into rectangular image information in which the distortion is reduced.

Accordingly, the values corresponding to the conditional expressions (1)-(8) are as shown in the following Table 12, and satisfy the following conditional expressions (1)-(8).

TABLE 12

CONDITION EXPRESSION

| CONDITION EXPRESSION (1) | f21/f22    | 0.31 |
| CONDITION EXPRESSION (2) | f21/f2     | 0.87 |
| CONDITION EXPRESSION (3) | D2/fw      | 1.10 |
| CONDITION EXPRESSION (4) | DS3w/D2Sw  | 0.75 |
| CONDITION EXPRESSION (5) | \|X1 − 2/f2\| | 3.01 |

TABLE 12-continued

CONDITION EXPRESSION

| CONDITION EXPRESSION (6) | φ2/φ1  | 0.68  |
| CONDITION EXPRESSION (7) | f2/fw  | -1.25 |
| CONDITION EXPRESSION (8) | TLt/ft | 1.15  |

Figure 10:
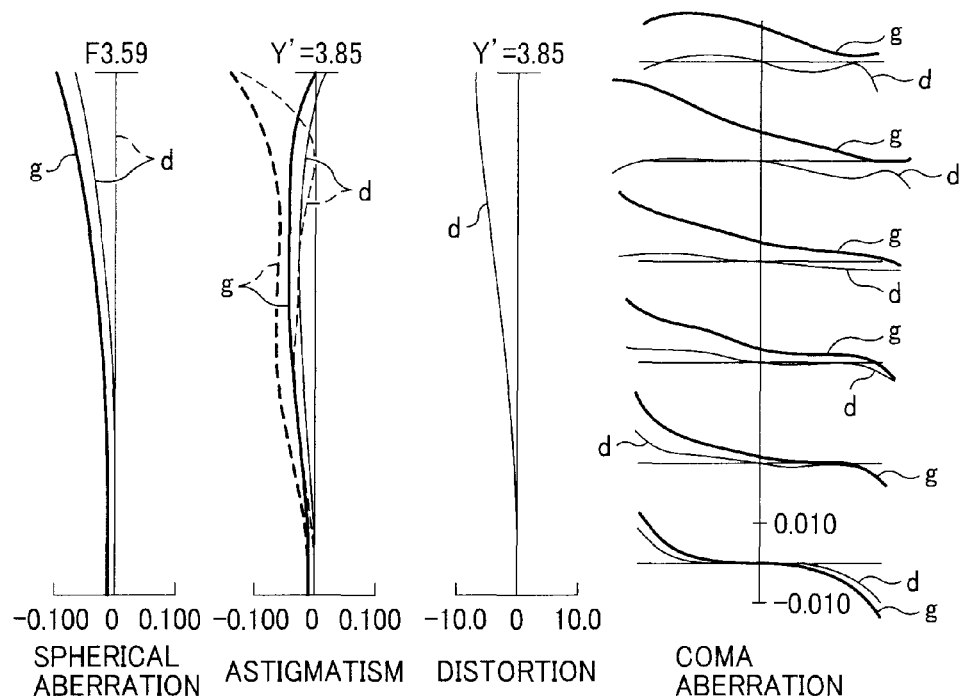
FIG. 10 is a view illustrating aberration curves of spherical aberration, astigmatism, distortion and coma aberration in the zoom lens according to Embodiment 3 illustrated in FIG. 9 at a short focal end (wide angle end).
Figure 11:
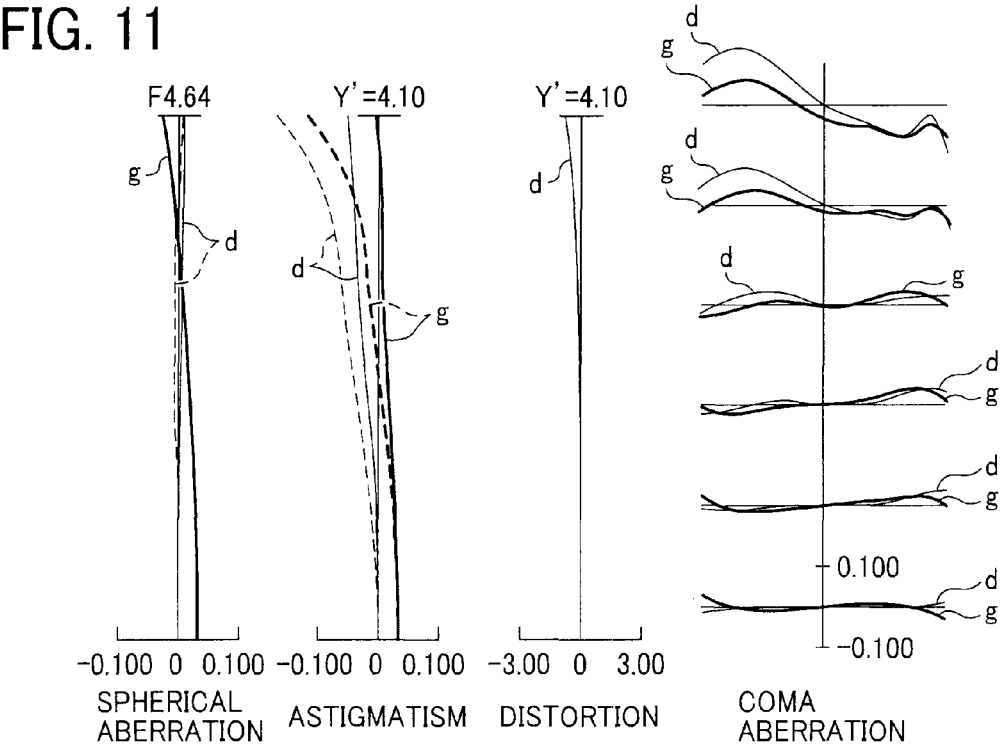
FIG. 11 is a view illustrating aberration curves of spherical aberration, astigmatism, distortion and coma aberration in the zoom lens according to Embodiment 3 illustrated in FIG. 9 at an intermediate focal length.
Figure 12:
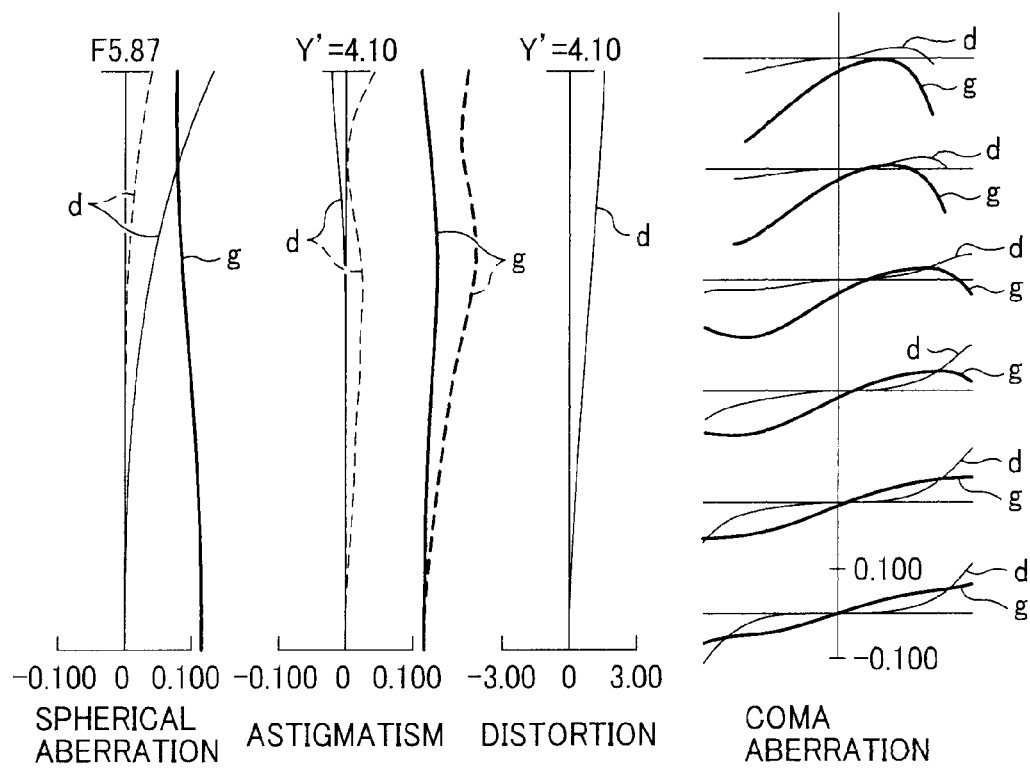
FIG. 12 is a view illustrating aberration curves of spherical aberration, astigmatism, distortion and coma aberration in the zoom lens according to Embodiment 3 illustrated in FIG. 9 at a long focal end (telephoto end).

FIGS. 10, 11, 12 illustrate aberrations views of coma aberration, distortion, astigmatism and spherical aberration at the wide angle end, the intermediate focal length and the telephoto end in Embodiment 3. In these views, the dashed line in the spherical aberration represents a sine condition and the solid line and the dashed line in the astigmatism represent sagittal and meridional, respectively. The reference numbers g, d in the aberration views of the spherical aberration, the astigmatism and the coma aberration represent g line and d line, respectively. These are the same as the aberration views in another embodiment.

Embodiment 4

Figure 13:
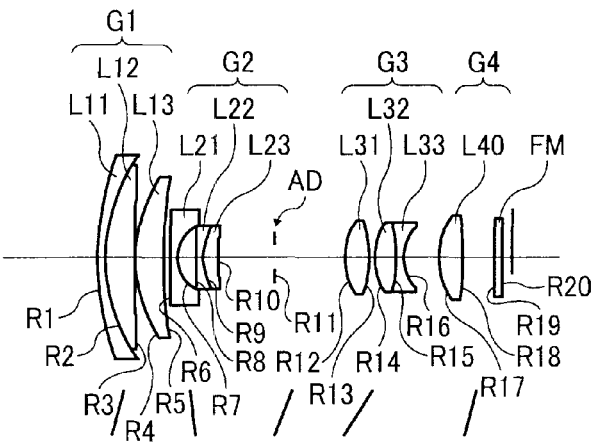
FIG. 13 is a schematic view illustrating a configuration of an optical system of a zoom lens and a zooming trajectory according to Embodiment 4 of the first embodiment of the present invention.
Figure 13:
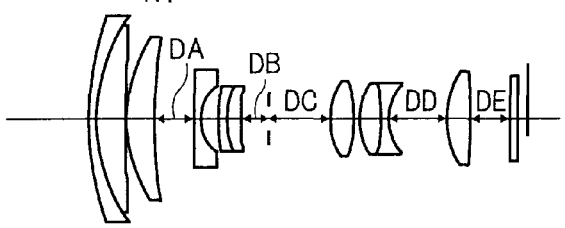
Figure 13:
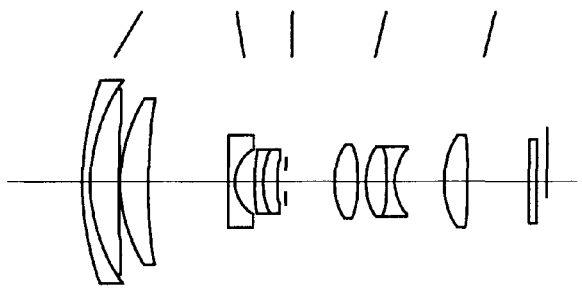
Figure 13:
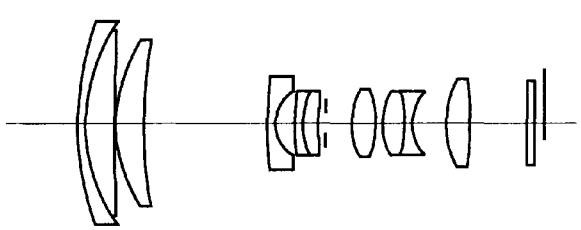
Figure 13:
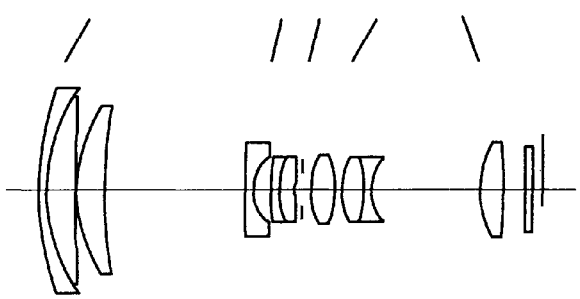

FIG. 13 is a schematic view illustrating a configuration of an optical system of a zoom lens and a zoom trajectory from the short focal end (wide angle end) to the long focal end (telephoto end) via a predetermined intermediate focal length according to Embodiment 4 of the first embodiment of the present invention; (a) illustrates a sectional view along the optical axis at the short focal end (Wide); (b) illustrates a sectional view along the optical axis at the focal length (Wide-Mean) between the short focal end and the intermediate focal length; (c) illustrates a sectional view along the optical axis at the intermediate focal length (Mean); (d) illustrates a sectional view along the optical axis at the focal length (Mean-Tele) between the intermediate focal length and the long focal end; (e) illustrates a sectional view along the optical axis at the long focal end (Tele).

The zoom lens illustrated in FIG. 13 includes, in order from the object side, along the optical axis, a first lens group G1 having a positive refractive power, a second lens group G2 having a negative refractive power, a third lens group G3 having a positive refractive power, a fourth lens group G4 having a positive refractive power and an aperture stop AD between the second and third lens groups G2, G3. The first lens group G1 includes a first lens L11, a second lens L12 and a third lens L13. The second lens group G2 includes a first lens L21, a second lens L22 and a third lens L23. The third lens group G3 includes a first lens L31, a second lens L32 and a third lens L33. The fourth lens group G4 includes a single lens L40.

When changing a magnification from the short focal end to the long focal end, all of the first to the fourth lens groups G1-G4 are moved, so that the interval between the first lens group G1 and the second lens group G2 is increased, the interval between the second lens group G2 and the third lens group G3 is decreased, the interval between the third lens group G3 and the fourth lens group G4 is increased, and the first lens group G1 and the third lens group G3 are moved to be located closer to the object side at the long focal end than the short focal end.

The first lens group G1 includes, in order from the object side, the first lens (negative lens) L11 of a negative meniscus lens having a convex surface on the object side, the second lens (first positive lens) L12 of a positive meniscus lens having a convex surface on the object side and the third lens (second positive lens) L13 of a positive meniscus lens having a convex surface on the object side. The two lenses of the first lens L11 and the second lens L12 are closely attached to each other to form a cemented lens having two lenses.

The second lens group G2 includes, in order from the object side, the first lens (first negative lens) L21 which is a negative meniscus lens having a convex surface on the object side and an aspheric lens forming an aspheric surface on the object side, the second lens (second negative lens) L22 of a negative meniscus lens having a convex surface on the object side and the third lens (positive lens) L23 which is a positive meniscus lens having a convex surface on the object side, and an aspheric lens forming an aspheric surface on the image side. The two lenses of the second lens L22 and the third lens L23 are closely attached to each other to form a cemented lens of the two lenses.

The aperture stop AD is arranged between the second and third lens groups G2, G3.

The third lens group G3 includes, in order from the object side, the first lens (first positive lens) L31 which is a biconvex positive lens having a strong convex surface on the object side and an aspheric lens forming an aspheric surface on both surfaces, the second lens (second positive lens) L32 having a biconvex positive lens having a strong convex surface on the object side and the third lens (negative lens) L33 of a biconcave negative lens having a strong concave surface on the image side. The two lenses of the second lens L32 and the third lens L33 are closely attached to each other to form a cemented lens of two lenses.

The fourth lens group G4 includes the single positive lens L40 which is a biconvex positive lens having a strong convex surface on the object side and an aspheric lens having an aspheric surface on the object side.

In this case, as illustrated in FIG. 13, when changing a magnification from the short focal end (wide-angle end) to the long focal end (telephoto end), the first lens group G1 monotonically moves from the image side to the object side, the second lens group G2 moves to the image side to depict a convex trajectory, and the third lens group G3 moves to the object side from the image side, moves to the image side from the object side, and again moves to the object side from the image side, and the fourth lens group G4 moves to the object side to depict a convex trajectory.

The optical feature of each optical element in Embodiment 4 is as shown in the following Table 13.

TABLE 13

| SURFACE NUMBER | R | D | N | ν | φ | GLASS | REMARK | |
|---|---|---|---|---|---|---|---|---|
| 1 | 32.064 | 0.80 | 2.00069 | 25.46 | 21.8 | TAFD40 (HOYA) | L11 | G1 |
| 2 | 18.776 | 3.20 | 1.59282 | 68.63 | 20.2 | FCD505 (HOYA) | L12 | |
| 3 | 226.673 | 0.20 | | | 20.0 | | | |
| 4 | 17.124 | 3.00 | 1.72916 | 54.68 | 17.6 | S-LAL18 (OHARA) | L13 | |
| 5 | 56.420 | VARIABLE DA | | | 17.0 | | | |
| 6* | 82.992 | 0.80 | 1.86400 | 40.58 | 10.2 | L-LAH83 (OHARA) | L21 | G2 |
| 7 | 4.283 | 1.91 | | | 7.0 | | | |
| 8 | 24.116 | 0.80 | 1.81600 | 46.62 | 7.0 | S-LAH59 (OHARA) | L22 | |
| 9 | 6.832 | 1.65 | 2.00178 | 19.32 | 6.6 | MFDS2 (HOYA) | L23 | |
| 10* | 18.548 | VARIABLE DB | | | 6.0 | | | |
| 11 | APERTURE STOP | VARIABLE DC | | | 2.5 | | AD | |
| 12* | 7.332 | 2.69 | 1.55332 | 71.68 | 7.3 | MFCD500 (HOYA) | L31 | G3 |
| 13* | −9.449 | 0.66 | | | 7.6 | | | |
| 14 | 8.806 | 2.37 | 1.59282 | 68.63 | 7.2 | FCD505 (HOYA) | L32 | |
| 15 | −13.301 | 0.83 | 1.85026 | 32.27 | 6.8 | S-LAH71 (OHARA) | L33 | |
| 16 | 5.720 | VARIABLE DD | | | 6.2 | | | |
| 17* | 10.174 | 2.57 | 1.52528 | 56.20 | 9.6 | PLASTIC | L40 | G4 |
| 18 | −45.123 | VARIABLE DE | | | 9.6 | | | |
| 19 | ∞ | 0.80 | 1.50000 | 64.00 | 8.8 | FILTER | FM | |
| 20 | ∞ | — | | | 8.8 | | | |

In Table 13, "*" indicates an aspheric surface, and "HOYA" and "OHARA" indicate the names of the glass makers of HOYA INC. and OHARA INC., respectively.

These are the same in another embodiment.

Namely, in Table 13, each optical surface of the sixth, tenth, twelfth, thirteenth and seventeenth surfaces to which "*" is applied is an aspheric surface, and parameters of each aspheric surface in the equation (9) are as shown in the following Table 14.

TABLE 14

| | | | | | | |
|---|---|---|---|---|---|---|
| ASPHERIC SURFACE COEFFICIENT | | | | | | |
| | | K | A4 | A6 | A8 | A10 |
| | 6 | 0 | −2.13100E−04 | 5.36880E−06 | −1.07091E−08 | −8.91080E−10 |
| | 10 | 0 | −6.87197E−04 | −8.00907E−06 | 7.90956E−07 | −9.47677E−08 |

TABLE 14-continued

ASPHERIC SURFACE COEFFICIENT

| | K | A4 | A6 | A8 | A10 |
|---|---|---|---|---|---|
| 12 | 0 | −6.68388E−04 | 2.76877E−05 | −2.52557E−06 | 1.10843E−07 |
| 13 | 0 | 1.82600E−04 | 3.92416E−05 | −3.58749E−06 | 1.52005E−07 |
| 17 | 0 | −2.42568E−05 | 3.24165E−06 | −1.12435E−07 | 1.76648E−09 |

In Embodiment 4, the focal length of the entire optical system, f, F-number, F, the half-field angle, ω, the variable interval DA between the first and second lens groups G1, G2, the variable interval DB between the second lens group G2 and the aperture stop AD, the variable interval DC between the aperture stop AD and the third lens group G3, the variable interval DD between the third and fourth lens groups G3, G4, and the variable interval DE between the fourth lens group G4 and the filter FM and the like are changed as shown in the following Table 15 with zooming.

TABLE 15

VARIABLE INTERVAL

| | SHORT FOCAL END (Wide) | SHORT-INTER-MEDIATE (W-M) | INTER-MEDIATE FOCAL LENGTH (Mean) | INTER-MEDIATE-LONG (M-T) | LONG FOCAL END (Tele) |
|---|---|---|---|---|---|
| f | 5.05 | 9.00 | 15.99 | 28.97 | 51.99 |
| F-NUMBER | 3.81 | 4.50 | 4.96 | 5.54 | 5.68 |
| ω | 39.65 | 25.64 | 14.89 | 8.10 | 4.43 |
| DA | 0.600 | 4.056 | 8.612 | 13.327 | 14.886 |
| DB | 6.013 | 2.895 | 0.889 | 0.800 | 0.800 |
| DC | 7.455 | 6.460 | 5.136 | 2.810 | 0.950 |
| DD | 3.500 | 6.041 | 5.170 | 3.599 | 11.690 |
| DE | 3.205 | 4.263 | 6.508 | 6.071 | 2.291 |

The opening diameter of the aperture stop AD at the long focal (Tele) end is φ3.6, and this image height Y'=4.1. Referring to FIG. 20, as described above, in order to correct the distortion by the image process, the imaging area at the long focal end (intermediate focal length) substantially conforms to the imaging area of the light-receiving element to obtain the rectangular imaging area, and at the short focal (Wide) end, the distortion is generated such that the imaging area at the short focal end becomes a barreled shape as Y'=3.65. Then, the barreled effective imaging area at the short focal end is converted by the image process into rectangular image information in which the distortion is reduced.

Accordingly, the values corresponding to the conditional expressions (1)-(8) are as shown in the following Table 16, and satisfy the following conditional expressions (1)-(8).

TABLE 16

CONDITION EXPRESSION

| | | |
|---|---|---|
| CONDITION EXPRESSION (1) | f21/f22 | 0.44 |
| CONDITION EXPRESSION (2) | f21/f2 | 0.98 |
| CONDITION EXPRESSION (3) | D2/fw | 1.02 |
| CONDITION EXPRESSION (4) | DS3w/D2Sw | 1.24 |
| CONDITION EXPRESSION (5) | |X1 − 2/f2| | 2.68 |
| CONDITION EXPRESSION (6) | φ2/φ1 | 0.69 |

TABLE 16-continued

CONDITION EXPRESSION

| | | |
|---|---|---|
| CONDITION EXPRESSION (7) | f2/fw | −1.06 |
| CONDITION EXPRESSION (8) | TLt/ft | 1.04 |

Figure 14:
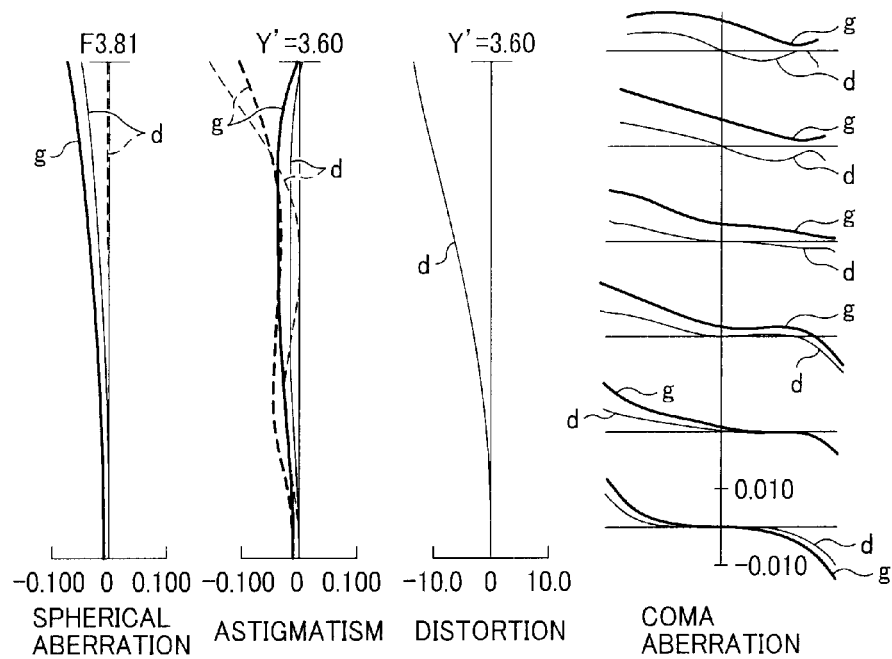
FIG. 14 is a view illustrating aberration curves of spherical aberration, astigmatism, distortion and coma aberration in the zoom lens according to Embodiment 4 illustrated in FIG. 13 at a short focal end (wide angle end).
Figure 15:
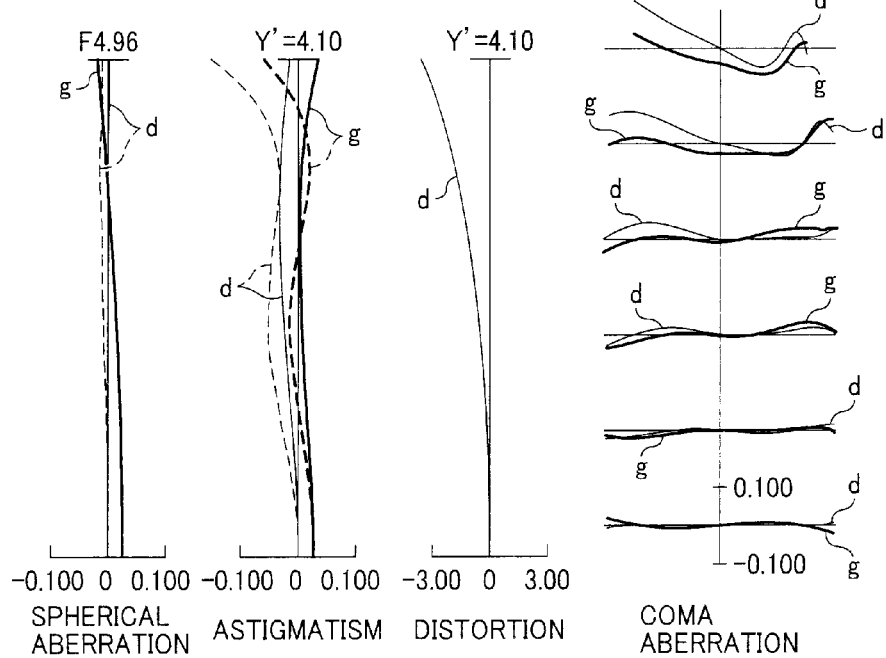
FIG. 15 is a view illustrating aberration curves of spherical aberration, astigmatism, distortion and coma aberration in the zoom lens according to Embodiment 4 illustrated in FIG. 13 at an intermediate focal length.
Figure 16:
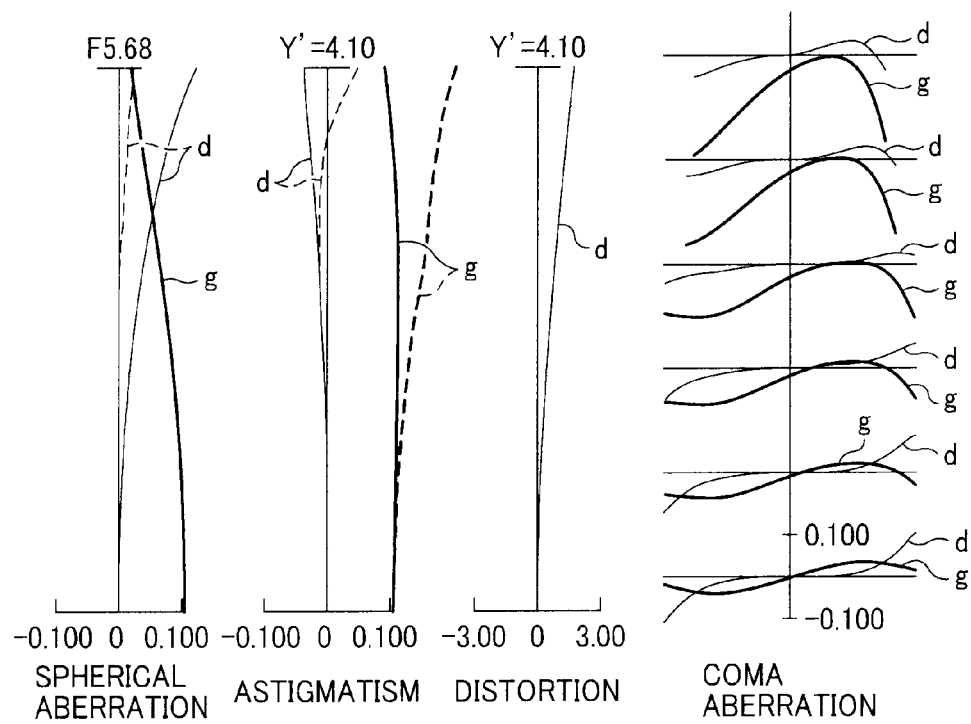
FIG. 16 is a view illustrating aberration curves of spherical aberration, astigmatism, distortion and coma aberration in the zoom lens according to Embodiment 4 illustrated in FIG. 13 at a long focal end (telephoto end).

FIGS. 14, 15, 16 illustrate aberration views of coma aberration, distortion, astigmatism and spherical aberration at the wide angle end, the intermediate focal length and the telephoto end in Embodiment 4. In these views, the dashed line in the spherical aberration represents a sine condition and the solid line and the dashed line in the astigmatism represent sagittal and meridional, respectively. The reference numbers g, d in the aberration views of the spherical aberration, the astigmatism and the coma aberration represent g line and d line, respectively. These are the same as the aberration views in another embodiment.

As described above, according to Embodiments 1-4 of the first embodiment of the present invention, the zoom lens having a significant wide angle, that is, a half-field angle of 38 degrees or more at a short focal end and a magnification ratio of 8 times or more can be provided. The zoom lens also achieves a small size with about 10 lenses in the configuration and a resolution corresponding to an imaging device having 10 million to 15 million pixels for the entire magnification range. According to the second embodiment of the present invention, a small and high quality imaging device such as a digital camera including a magnification range which well-covers a general shooting area can be achieved by using the zoom lens according to the first embodiment of the present invention, and an information device such as a portable digital assistant including the imaging device can be achieved.

Moreover, by well-correcting the off-axis aberration at the short focal end, a high performance and small zoom lens can be provided, and a small imaging device and a small information device which can obtain a good picture at the peripheral part of the screen at the short focal end can be achieved by using such a zoom lens.

Furthermore, by further well-correcting each aberration, a stabilized zoom lens having a high performance can be provided, and a high quality imaging device and information device having high resolution can be achieved.

Although the embodiments of the present invention have been described below, the present invention is not limited thereto. It should be appreciated that variations may be made in the embodiments described by persons skilled in the art without departing from the scope of the present invention.

What is claimed is:

1. A zoom lens, comprising: in order from an object side, a first lens group having a positive refractive power;
a second lens group having a negative refractive power, the second lens group including, in order from the object side, a first negative lens and a cemented lens including a second negative lens having a convex shape on the object side and a positive lens;
a third lens group having a positive refractive power;
a fourth lens group having a positive refractive power; and
an aperture stop arranged between the second lens group and the third lens group, wherein when changing a magnification from a short focal end to a telephoto focal end, an interval between the first lens group and the second lens group is increased, an interval between the second lens group and the third lens group is decreased, an interval between the third lens group and the fourth lens group is increased, and the first lens group and the third lens group is moved to be located closer to the object side at the telephoto focal end than the short focal end; and wherein the following conditional expression is satisfied where an interval between the second lens group and the aperture stop at the short focal end is D2Sw and an interval between the aperture stop and the third lens group at the short focal end is DS3w;

$$0.3 < DS3w/D2Sw < 2.0.$$

2. The zoom lens according to claim 1, wherein the following conditional expression is satisfied where a focal length of the first negative lens of the second lens group is f21 and a focal length of the second negative lens f the second lens group is f22;

$$0.1 < f21/f22 < 0.8.$$

3. The zoom lens according to claim 1, wherein the following conditional expression is satisfied where a focal length of the first negative lens of the second lens group is f21 and a focal length of the second lens group is f2;

$$0.5 < f21/f2 < 1.5.$$

4. The zoom lens according to claim 1, wherein the following conditional expression is satisfied where a thickness of the second lens group on an optical axis is D2 and a focal length of an entire lens system of at the short focal end is fw;

$$0.7 < D2/fw < 1.3.$$

5. The zoom lens according to claim 1, wherein the positive lens of the second lens group includes an image side surface having a convex shape on the object side and an aspheric face.

6. The zoom lens according to claim 1, wherein the following conditional expression is satisfied where a variation of the interval between the first lens group and the second lens group when changing a magnification from the short focal end to the telephoto focal end is X1-2 and a focal length of the second lens group is f2;

$$2.0 < |X1-2/f2| < 4.0.$$

7. The zoom lens according to claim 1, wherein the following conditional expression is satisfied where an effective light beam diameter of an object side surface of the first negative lens of the second lens group is $\phi1$ and an effective light beam diameter of the object side surface of the second negative lens of the second lens group is $\phi2$;

$$0.50 < \phi2/\phi1 < 0.80.$$

8. An imaging device comprising the zoom lens according to claim 1 as an imaging optical system.

9. An information device having an imaging function comprising the zoom lens according to claim 1 as an imaging optical system.

10. A zoom lens, comprising: in order from an object side,
a first lens group having a positive refractive power;
a second lens group having a negative refractive power, the second lens group including, in order from the object side, a first negative lens and a cemented lens including a second negative lens having a convex shape on the object side and a positive lens;
a third lens group having a positive refractive power;
a fourth lens group having a positive refractive power; and
an aperture stop arranged between the second lens group and the third lens group, wherein when changing a magnification from a short focal end to a telephoto focal end, an interval between the first lens group and the second lens group is increased, an interval between the second lens group and the third lens group is decreased, an interval between the third lens group and the fourth lens group is increased, and the first lens group and the third lens group is moved to be located closer to the object side at the telephoto focal end than the short focal end; and wherein the following conditional expression is satisfied where an effective light beam diameter of an object side surface of the first negative lens of the second lens group is $\phi1$ and an effective light beam diameter of the object side surface of the second negative lens of the second lens group is $\phi2$;

$$0.50 < \phi2/\phi1 < 0.80.$$

11. The zoom lens according to claim 10, wherein the following conditional expression is satisfied where a focal length of the first negative lens of the second lens group is f21 and a focal length of the second negative lens f the second lens group is f22;

$$0.1 < f21/f22 < 0.8.$$

12. The zoom lens according to claim 10, wherein the following conditional expression is satisfied where a focal length of the first negative lens of the second lens group is f21 and a focal length of the second lens group is f2;

$$0.5 < f21/f2 < 1.5.$$

13. The zoom lens according to claim 10, wherein the following conditional expression is satisfied where a thickness of the second lens group on an optical axis is D2 and a focal length of an entire lens system of at the short focal end is fw;

$$0.7 < D2/fw < 1.3.$$

14. The zoom lens according to claim 10, wherein the positive lens of the second lens group includes an image side surface having a convex shape on the object side and an aspheric face.

15. The zoom lens according to claim 10, wherein the following conditional expression is satisfied where a variation of the interval between the first lens group and the second lens group when changing a magnification from the short focal end to the telephoto focal end is X1-2 and a focal length of the second lens group is f2;

$$2.0 < |X1-2/f2| < 4.0.$$

16. An imaging device comprising the zoom lens according to claim 10 as an imaging optical system.

17. An information device having an imaging function comprising the zoom lens according to claim 10 as an imaging optical system.

* * * * *